US006999413B2

(12) United States Patent
Moriwaki et al.

(10) Patent No.: US 6,999,413 B2
(45) Date of Patent: Feb. 14, 2006

(54) PACKET SWITCHING APPARATUS

(75) Inventors: Norihiko Moriwaki, Kokubunji (JP); Hidehiro Toyoda, Musashino (JP); Masayuki Takase, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 882 days.

(21) Appl. No.: 09/940,476

(22) Filed: Aug. 29, 2001

(65) Prior Publication Data

US 2002/0057712 A1 May 16, 2002

(30) Foreign Application Priority Data

Nov. 13, 2000 (JP) ............................. 2000-350555

(51) Int. Cl.
*G01R 31/08* (2006.01)

(52) U.S. Cl. ........................ 370/228; 370/387; 370/217

(58) Field of Classification Search ................ 370/216, 370/380, 386
See application file for complete search history.

(56) References Cited

U.S. PATENT DOCUMENTS 5,414,696 A 5/1995 Tsuzuki et al.
6,256,293 B1 * 7/2001 Gerstel et al. .............. 370/228
6,263,415 B1 * 7/2001 Venkitakrishnan ........... 712/11
2001/0030942 A1 * 10/2001 Suzuki ........................ 370/228

FOREIGN PATENT DOCUMENTS

EP 0918419 A2 11/1998
EP 1009132 A2 12/1999

OTHER PUBLICATIONS

"Tiny Tera: A Packet Switch Core," Nick McKeown, Martin Izzard, Adisak Mekkittikul, William Ellersick and Mark Horowitz, IEEE Micro, 1997, pp. 26-33.

* cited by examiner

*Primary Examiner*—Chi Pham
*Assistant Examiner*—Kamran Emdadi
(74) *Attorney, Agent, or Firm*—Reed Smith LLP.; Stanley P. Fisher, Esq.; Juan Carlos A. Marquez, Esq.

(57) ABSTRACT

A packet switch has a switch section formed by a plurality of crossbar switch planes and plurality of interfaces, and each interface outputs in parallel input packets in block units to the plurality of crossbar switch planes in response to signals from a scheduler, wherein when n crossbar switch planes can be mounted on the packet switch, each interface allocates time slots corresponding to the n crossbar switch planes or when a switch plane is additionally mounted, a block is read at a time slot corresponding to the additional switch plane or when a switch plane is stopped from working, an idle time slot is used to prevent a block from being output to the switch plane which is unused.

10 Claims, 27 Drawing Sheets

PACKET SWITCHING APPARATUS

BACKGROUND OF THE INVENTION

The present invention relates to a packet data communication apparatus for switching variable-length packets in data transmission of IP (Internet Protocol), for example, and fixed-length packets (generally called cells) in data transmission of ATM (Asynchronous Transfer Mode).

Nowadays, data traffic is increasing on networks, especially, on the Internet. There are moves toward executing high-quality and high-reliability services such as transaction processes which have been done on leased lines, on the Internet for the purpose of cost reduction. To cope with this tendency, there have been demands for larger capacity, higher speed and improved reliability of packet data communication apparatus as well as the transmission lines.

JP-A-11-154954 published on Jun. 8, 1999 (corresponding to U.S. Ser. No. 08/193,414 and EP 0918419A; hereafter referred to as Literature 1) discloses a technology regarding for increasing the capacity of an ATM switch. This ATM switch has n pieces of cell distributors respectively connected input highways and n pieces of cell assemblers respectively connected to output highways, and k pieces of unit ATM switches arranged in parallel having each switching capacity of n×n. Each of the n cell distributors and each of the n assemblers are connected to k pieces of unit ATM switches. Each cell distributor includes n queue buffers corresponding to the n cell assemblers. When receiving a cell from the input highway, the cell is buffered in a queue buffer corresponding to the cell assembler to which the cell is to be output, in other words, into a queue buffer corresponding to the destination of the cell. The cell distributor reads cells successfully from a selected queue buffer up to a number specified by a readout count specifying register, and outputs in parallel k cells bound for the same destination to k unit ATM switches at almost the same timing. The reason why cells are output in parallel at almost the same timing is to preserve the order of cell sequence. A cell assembler receives k cells bound for the same destination from the k unit ATM switches. If cells queued in the selected buffer are fewer than the number specified by the readout count specifying register, dummy cells are generated as many as a number of that difference, and the cells buffered in the selected queue buffer and dummy cells are output in parallel to the k unit ATM switches at almost the same timing. The cell assembler discards the dummy cells on receiving dummy cells from the k unit ATM switches. The technology disclosed in literature 1, by using the configuration mentioned above, performs load balancing on cell basis and increases the capacity of the ATM switch.

Literature 1 states that the unit ATM switches are of a shared buffer type, an output buffer type, or a crosspoint buffer type, none of which suffer from internal blocking of data traffic. The structure of the shared buffer type switch is shown in FIG. 25. Cells input from inputs 500 are multiplexed in time division by a cell multiplexer 501. Then, the time-division-multiplexed cells are stored in a shared buffer memory 503. More specifically, based on header information, cells are controlled by a controller 502 so that they are stored in queue buffers allotted for respective output lines logically configured in the shared buffer memory 503. The cells, which are read from the shared buffer memory at specified timing allotted to respective output lines 505, are demultiplexed by a cell demultiplexer 504 and output to respective output lines. The structure of the output buffer type switch is shown in FIG. 26. The cells input from the input lines 500 are time-division-multiplexed by the cell multiplexer 501 and output to a shared bus 506. Before being sent on respective output lines 505, cells on the shared bus are filtered by each address filter (AF) 507 in such a way that cells having the same destination address as specified in the address filter 507 and only cells related to the same route are filtered and stored in the queue buffers 508. From the queue buffers 508, cells are read at speed of the output lines 505. The structure of the crosspoint type switch is shown in FIG. 27. Cells input from the input lines 500 are stored in queue buffers 509 provided at their intersections with the output lines 505. Each output line 505 conducts arbitration among the corrected queue buffers 509 which are connected to the same output line 505. All of the shared buffer type, output buffer type and crosspoint buffer type switches have a buffering means to absorb collisions of cell output.

A technology that uses crossbar switches is disclosed in "Tiny Tera: Packet Switch Core "" by Nick McKeown, Martin Izzard, Adisak Mekkitikul, William Ellersack, and Mark Horowitz, IEEE MICRO, January/February 1997 (hereafter referred to as literature 2). The switch disclosed in literature 2 seems to be a switch for the most part as illustrated in FIG. 28. In the preceding stage of a crossbar switch 706 with n input ports and n output ports, there are provided n port cards 701, and an input buffer 703 is provided for each port card 701. Variable length packets input through input lines 700 are divided into fixed length packets (cells). The cells stored in each input buffer 703 are subjected to connection scheduling between the input and output ports of the switch 706, and then output from the port card 701, and switched by the crossbar switch 706. The connections between the input and output ports are changed once for every cell. In this configuration, each input buffer 703 is divided into n queue buffers (VOQ Virtual Output Queue) corresponding to different output ports, and it is made possible to read any queue buffer specified by the scheduler 705, thereby preventing a decrease in throughput due to HOL (Head Of Line) Blocking. The crossbar switch 706 slices a cell 704 into pieces of 64-bit data, for example, which are processed in parallel by a plural switch planes.

JP-A-2000-232482 published on Aug. 22, 2000 (which corresponds to U.S. Ser. No. 09/362,134 and EP1009 132A; hereafter referred to as literature 3) discloses a packet switch using crossbar switches. In this packet switch, at the input-side interface of the switch, a plurality of variable length packets are loaded in fixed length containers regardless of where packets are divided, and switching is performed by the unit of container. In this switching, large processing unit of containers enables parallel expansion of switching and thereby realizes a large capacity switching apparatus.

JP-A-5-191440 published on Jul. 30, 1993 (which corresponds to U.S. Pat. No. 5,414,696; hereafter referred to as literature 4) discloses a cell switch including a cell switch that operates as a working system, a cell switch that operates as a protection system, and a selector for switching over the working system and the stand-by system. Identical cells are input to the two cell switches at the same phase. However, the cells output from the two cell switches sometimes differ in the timing. Therefore, the selector performs switch-over from one system to another at the timing when idle cells are detected at the output of both switches.

The packet switch disclosed in literature 1 is superior in expandability. However, the unit switches arranged in parallel are having a buffering element to prevent output collisions. Therefore, when expansion switch planes are added without stopping the operation of the ATM switch, there is a possibility that the order of cells is reversed due to discrepancy in buffering state among switch planes. Thus, it is difficult to expand or decrease the switch capacity or maintain the switch apparatus without interrupting communication service. Furthermore, literature 1 does not disclose a redundancy of switch configuration.

In the switch of literature 2, crossbar switches are used, and because this switch system has distributed buffers and bufferless crossbar, in which the access speed of buffer memories is less likely to be a bottleneck. Therefore, crossbar switch is more suitable for capacity expansion compared with the shared resource type, such as the shared buffer type. However, when constructing an ultra-large capacity switch to support high-speed transmission lines in near future, in crossbar switches that use ATM cells or cells obtained by dividing variable length packets (cells are hereafter referred to data of short fixed lengths of about 64 bytes) as processing units will have a bottleneck of scheduling time that decides connection relationship of input and output ports cell by cell. Therefore, it will become difficult to configure a crossbar switch with high throughput. Moreover, literature 2 does not disclose how to expand or decrease the switch capacity, or perform maintenance of the switch nor does it disclose a redundancy of switch configuration.

Literature 3 does not disclose that the switch is formed by crossbar switches. Nor does literature 3 disclose how to expand or decrease the switch capacity and how to maintain the switch, nor does it disclose a switch redundancy configuration.

For the switch with a redundancy configuration as shown in literature 4, twice as much as the amount of hardware is required for the switch. Therefore, it is difficult to configure a packet communication apparatus in a compact size and at low cost. Moreover, literature 4 does not disclose how to expand or decrease the switch capacity, or how to perform maintenance of the switch apparatus without interrupting communication service.

SUMMARY OF THE INVENTION

An object of the present invention is to provide a packet communication apparatus with high throughput and large capacity. More particularly, an object of the present invention is to provide a packet communication apparatus with large capacity and high throughput even when ATM cells or short packets are input successfully.

Another object of the present invention is to provide a large capacity packet communication apparatus capable of expanding or decreasing the switch capacity easily and, more specifically, to provide a packet communication apparatus capable of adding or disconnecting switch planes easily without service interruption to enable expansion or reduction of switch capacity or maintenance and inspection of the switches. Moreover, also included in this object is to provide a scalable packet communication apparatus such that the switch capacity is proportional to the number of switch planes when expanding or reducing the switch capacity.

Yet another object of the present invention is to provide a large capacity packet communication apparatus capable of easily realizing high reliability with a small amount of hardware and, more particularly, to provide a packet communication apparatus with a compact switch configuration with no need of a full redundancy switch configuration, which requires a large amount of hardware, and with a switch configuration that enables no service interruption by isolating only a faulty switch plane when a fault occurs. It is also included in this object is to provide a packet communication apparatus not liable to service down because it is capable of sequentially isolating faulty switch planes even when two or more switch planes become faulty though a supportable service capacity is reduced.

According to an aspect of the present invention, the switch section is formed by a plurality of crossbar switches. Each interface part outputs packets bound for the same destination gathered in blocks to the plurality of crossbar switches in parallel. When n crossbar switches can be mounted on the packet switch, the interface part allocates time slots corresponding to n crossbar switches. When n-1 crossbar switches are carrying out communication service, each interface part reads n-1 blocks bound for the same destination and outputs in parallel those blocks to n-1 crossbar switches in parallel. The interface part makes an idle time slot corresponding to the crossbar switch plane, which is not mounted or which is mounted but unused, and prevents any block from being output to that switch plane. Under this condition, if one crossbar switch is additionally installed, or if a crossbar switch, which has been mounted but not in use, is put into use, each interface part starts reading a block also at a time slot corresponding to the enabled crossbar switch. Then, each interface part will have read n blocks bound for the same destination, and outputs the n blocks to the n crossbar switches in parallel. While n crossbar switch planes are performing communication service, if one switch plane has become unable to operate by some trouble or this switch plane is temporarily stopped for maintenance work, the interface part makes an idle time slot corresponding to this switch plane and prevents any block from being output to this switch plane.

DETAILED DESCRIPTION OF THE EMBODIMENTS

Description will be made of an embodiment of a packet switch according to one embodiment of the present invention by taking as an example a packet switch comprising five planes of crossbar switches each having a specific capacity (n×n). Even when a largest number of line interfaces that are mountable on this packet switch are mounted, four planes of crossbar switches are supposed to be sufficient in respect of processing capacity. More specifically, if four switch planes are used, it is assumed that the switching performance is not deteriorated, such as being suffered internal blocking of input traffic. Description will be made later on how to use one extra switch plane, which is not necessary in terms of switch capacity.

Figure 1:
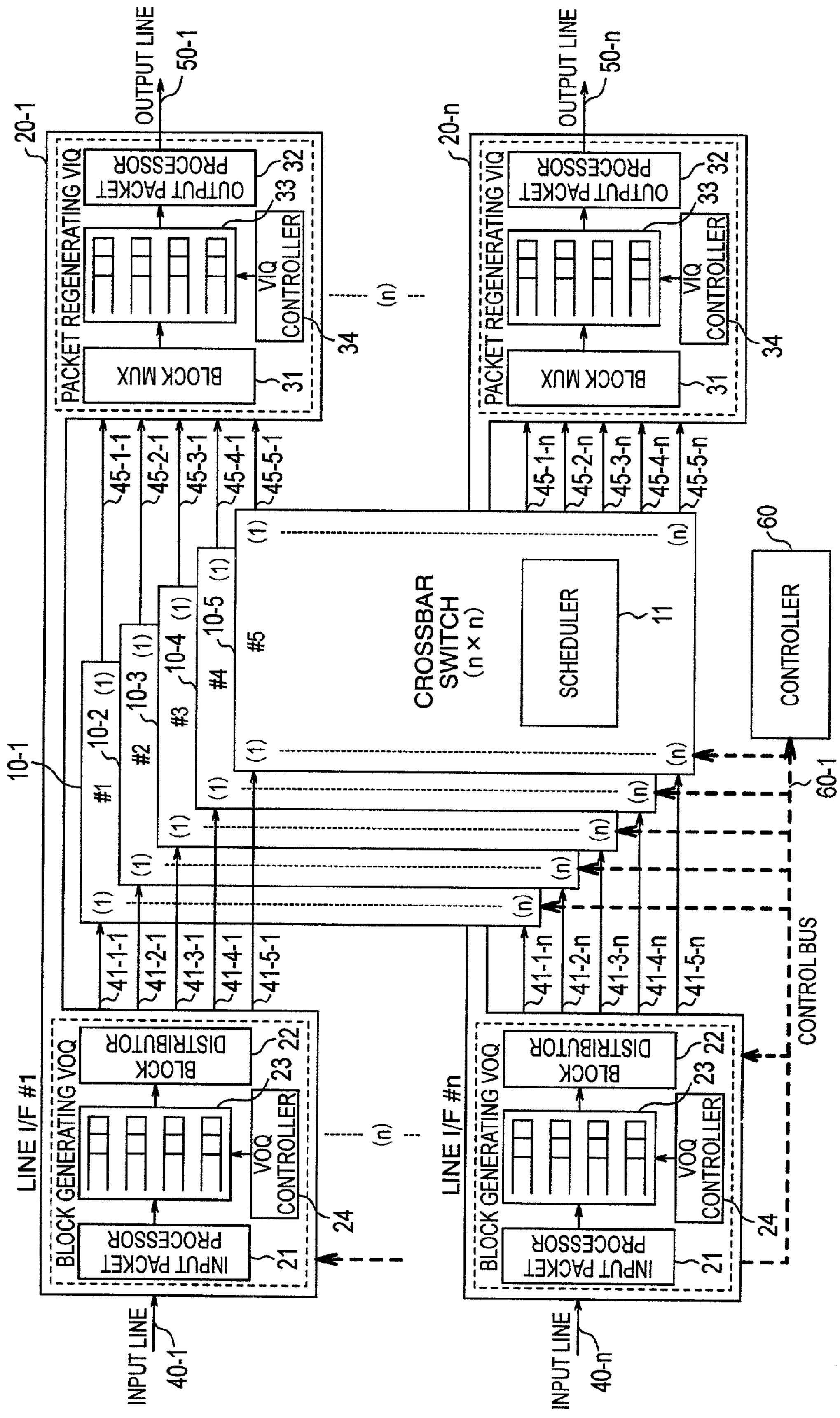
FIG. 1 is a block diagram showing a general configuration of a packet communication apparatus according to one embodiment of the present invention.

FIG. 1 is a diagram showing a configuration example of a packet switch according to one embodiment of the present invention. This packet communication apparatus includes a plurality of crossbar switches 10-1~10-5, provided with n input ports and n output ports for n×n switching, line interfaces **20-1~20-*n* connected to the crossbar switches 10-1~10-5, and a controller 60. The line interfaces 20-1~20-*n* each accommodate one of the input lines 40-1~40-*n* and one of the output lines 50-1~50-*n*, and perform a routing processing and packet buffering for incoming fixed length or variable length packets. The line interfaces transmit and receive fixed length blocks to and from the crossbar switches 10-1~10-5. The controller 60, which are connected through a control bus 60-1 to the crossbar switches 10 and the line interfaces 20, performs setting and fault-monitoring of those devices. The crossbar switches 10 each contain a scheduler 11 that has a function of deciding connection relationship of the input and output ports. Each line interface 20 distributes fixed length blocks which are obtained by joining data packets from the input line 40, to the crossbar switches 10-1~10-5 through five connection links (41-1-*x* to 41-5-*x*, where x is one of 1~n), and receives fixed length blocks from the crossbar switches 10-1~10-5 through five connection links (45-1-*x*~45-5-*x***, where x is any of 1~n).

The input side of the line interface 20 includes an input packet processor 21, a block generating VOQ 23, a VOQ controller 24, and a block distributor 22. The output side of the line interface 20 includes a block multiplexer 31, a packet regenerating VIQ (Virtual Input Queue) 33, a VIQ controller 34, and an output packet processor 32.

Figure 2A:
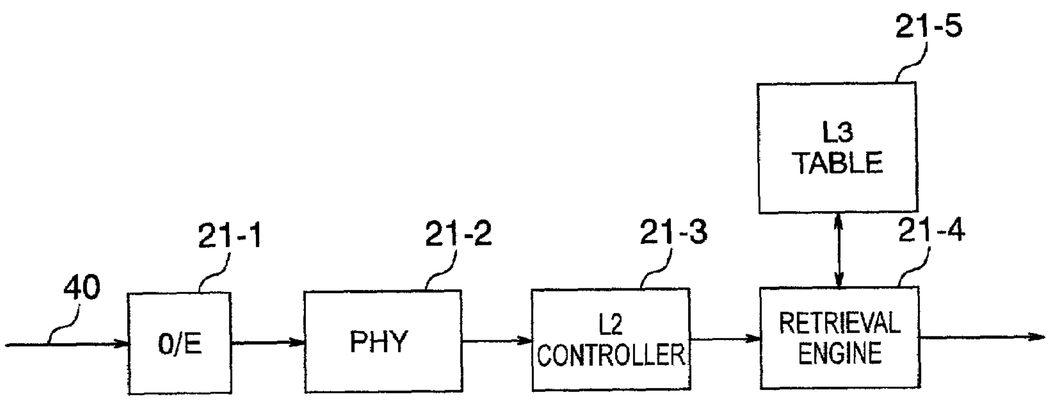
FIG. 2A is a block diagram showing a structure of a line interface card (input side) of a packet communication apparatus according to one embodiment of the present invention.
Figure 12:
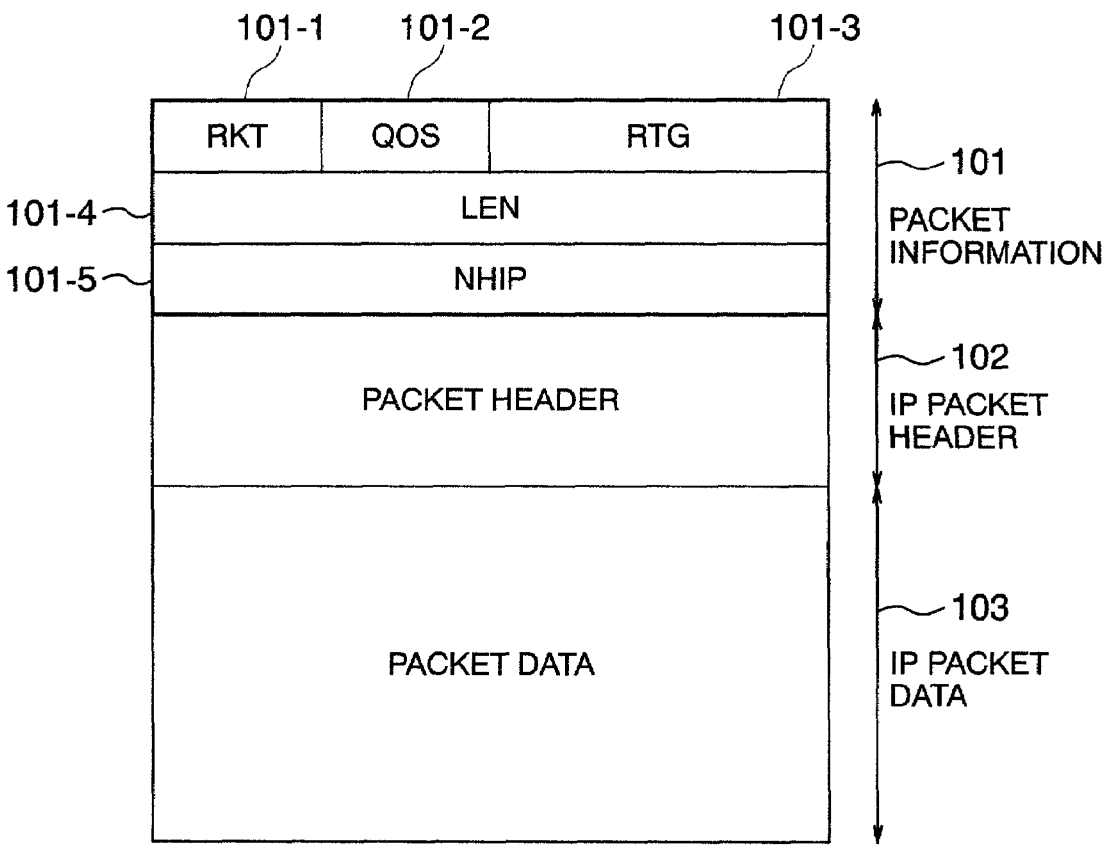
FIG. 12 shows a packet format used in a packet communication apparatus according to one embodiment of the present invention.

Referring to FIG. 2A, an example of the structure of the input packet processor 21 will be described. When packet data is input to the apparatus through the input line 40, an optical/electrical signal converter (O/E) 21-1 converts optical signal into electrical signal. Then, a PHY 21-2 performs a physical layer process, such as SONET (synchronous optical network) framing structure check, for example. After this, an L2 controller 21-3 extracts packets and performs a layer 2 processing, such as error check. Then, a retrieval engine 21-4 performs a layer 3 processing, such as output port search and quality class search, based on destination IP addresses. Searching are performed by using L3TABLE 21-5 connected to the retrieval engine 21-4. The L3TABLE 21-5 has a table containing output ports, quality classes and next hop IP addresses of next nodes. A search result is inserted in the header of a packet. FIG. 12 shows an example of packet format. A packet includes IP packet data 103, an IP packet header 102 containing the destination IP address, for example, and packet information 101 used within the packet communication apparatus under discussion. Packet information 101 includes PKT 101-1 showing whether the packet is valid or invalid, QOS 101-2 showing quality class of the packet, routing information RTG 101-3 showing the destination port of switch, packet length (LEN) 101-4 showing the packet's own length, and next hop IP address (NHIP) 101-5.

Figure 3:
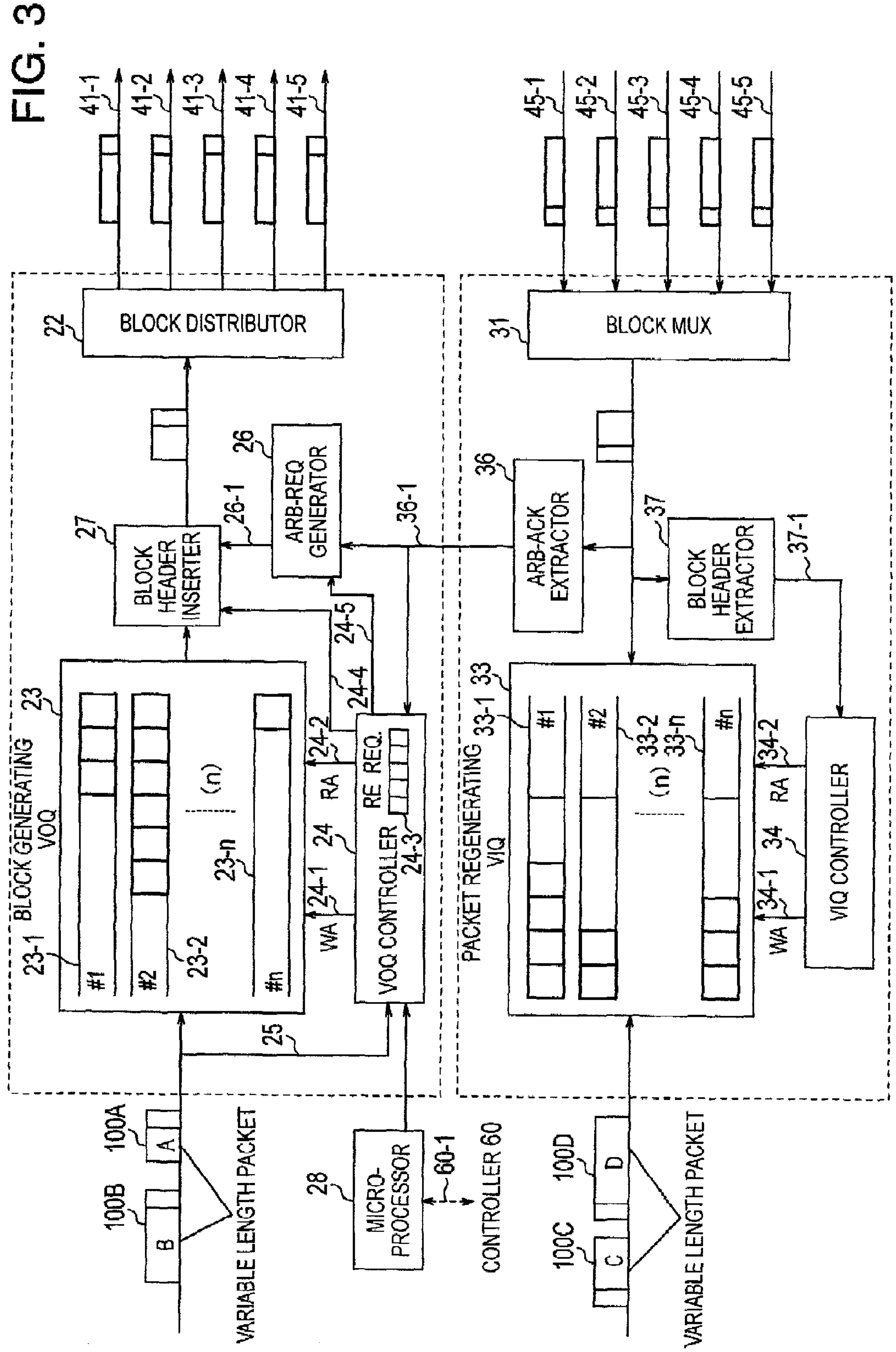
FIG. 3 is a block diagram showing a structure of a line interface card (output side) of a packet communication apparatus according to one embodiment of the present invention.

Referring to FIG. 3, description will be made of the functions of other parts of the input side of the line interface 20. Packet information 101 of variable length packets 100A and 100B output from the retrieval engine 21-4 is sent to the VOQ controller 24 through a connection line 25. The VOQ controller 24 analyses the packet information, and specifies write addresses WA 24-1 in the block generating VOQ 23 so that the variable length packets can be stored sequentially in a block generating VOQ (one of 23-1~23-*n*) that corresponds to an output port of the switch related to those variable length packets. When reading those packets from the block generating VOQ 23, a plurality of variable length packets stored in a queue are divided into fixed length blocks.

Figure 4:
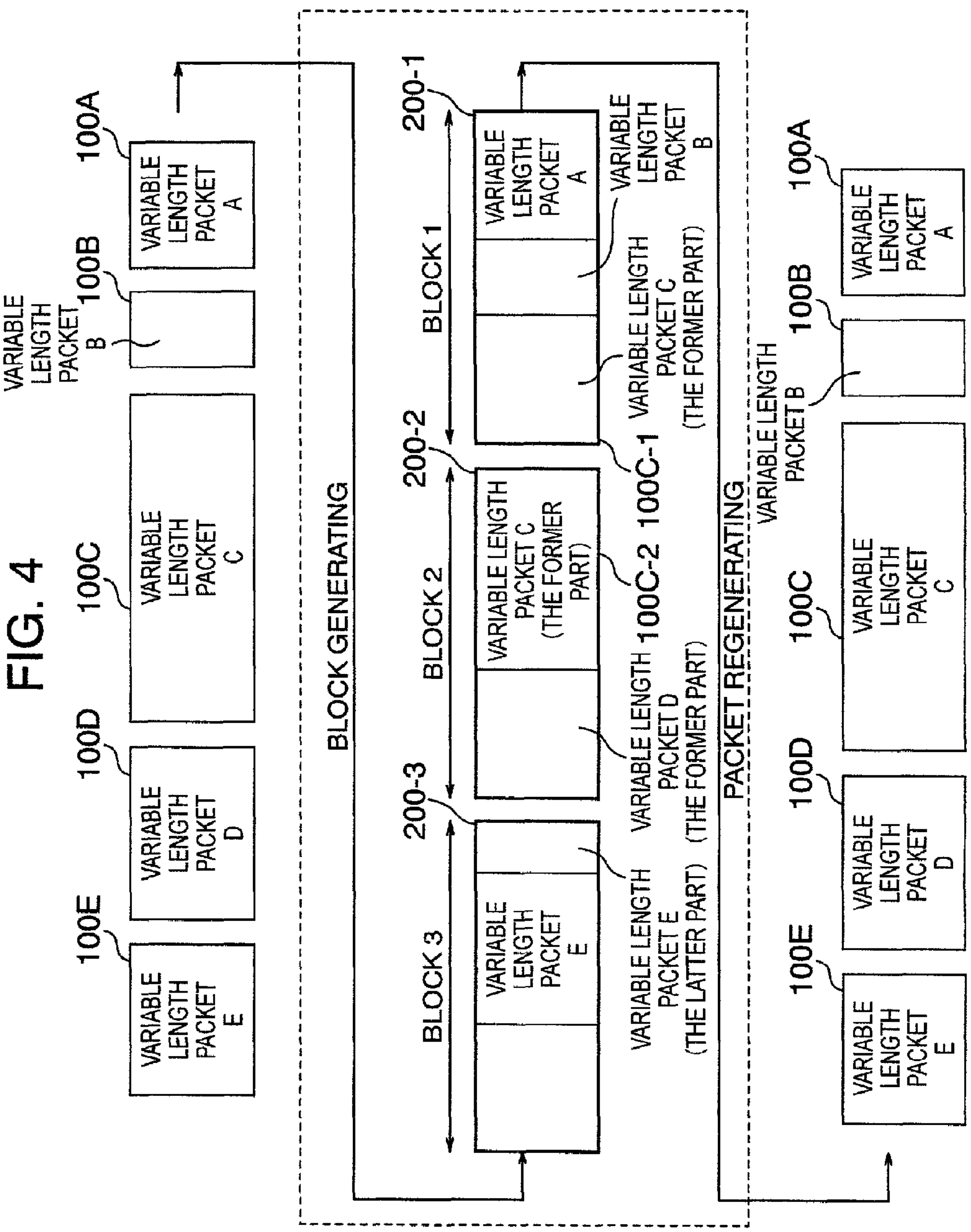
FIG. 4 is a block diagram showing the operation fixed-length generation from plural packets and packet regeneration in a packet communication apparatus according to one embodiment of the present invention.

Referring to FIG. 4, the block generating process will be described. FIG. 4 shows a case where a plurality of variable length packets (100A~100E) are divided into three fixed length blocks—block 1 (200-1), block 2 (200-2) and block 3 (200-3). A variable length packet C, including variable length parts 100C-1 and 100C-2, is permitted to be laid over a plurality of blocks. By allowing packet division extending over some blocks such as mentioned above, insertions of stuff bytes, which often occur when a variable length packet is divided into a number of cells can be decreased. Therefore, decrease in switch throughput that would otherwise occur can be restricted.

Figure 10:
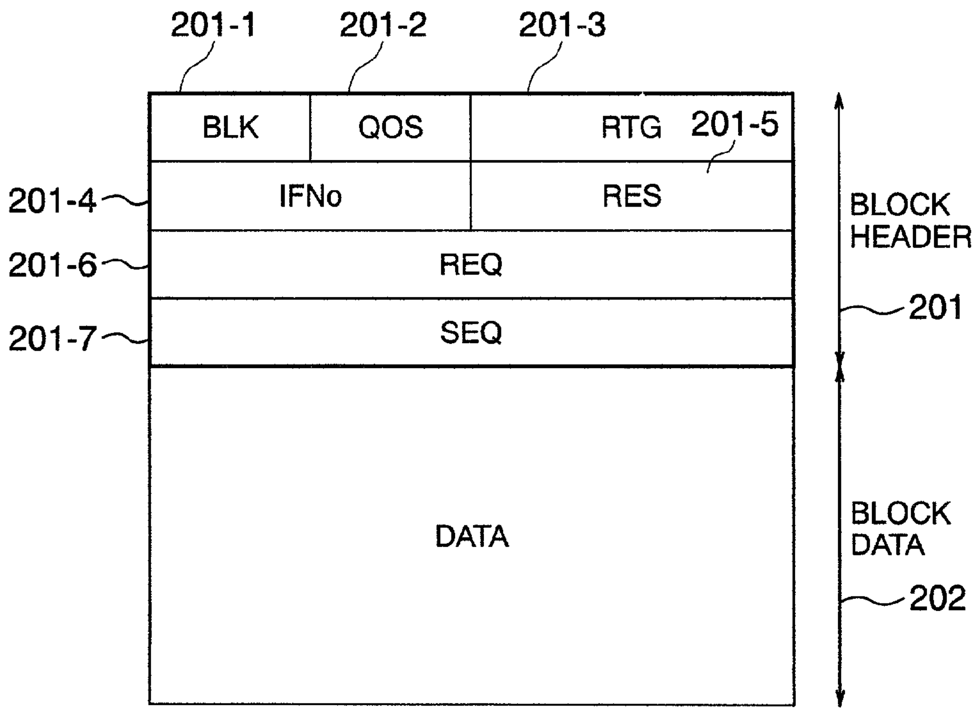
FIG. 10 shows an example of a block format used in a packet communication apparatus according to one embodiment of the present invention.
Figure 29:
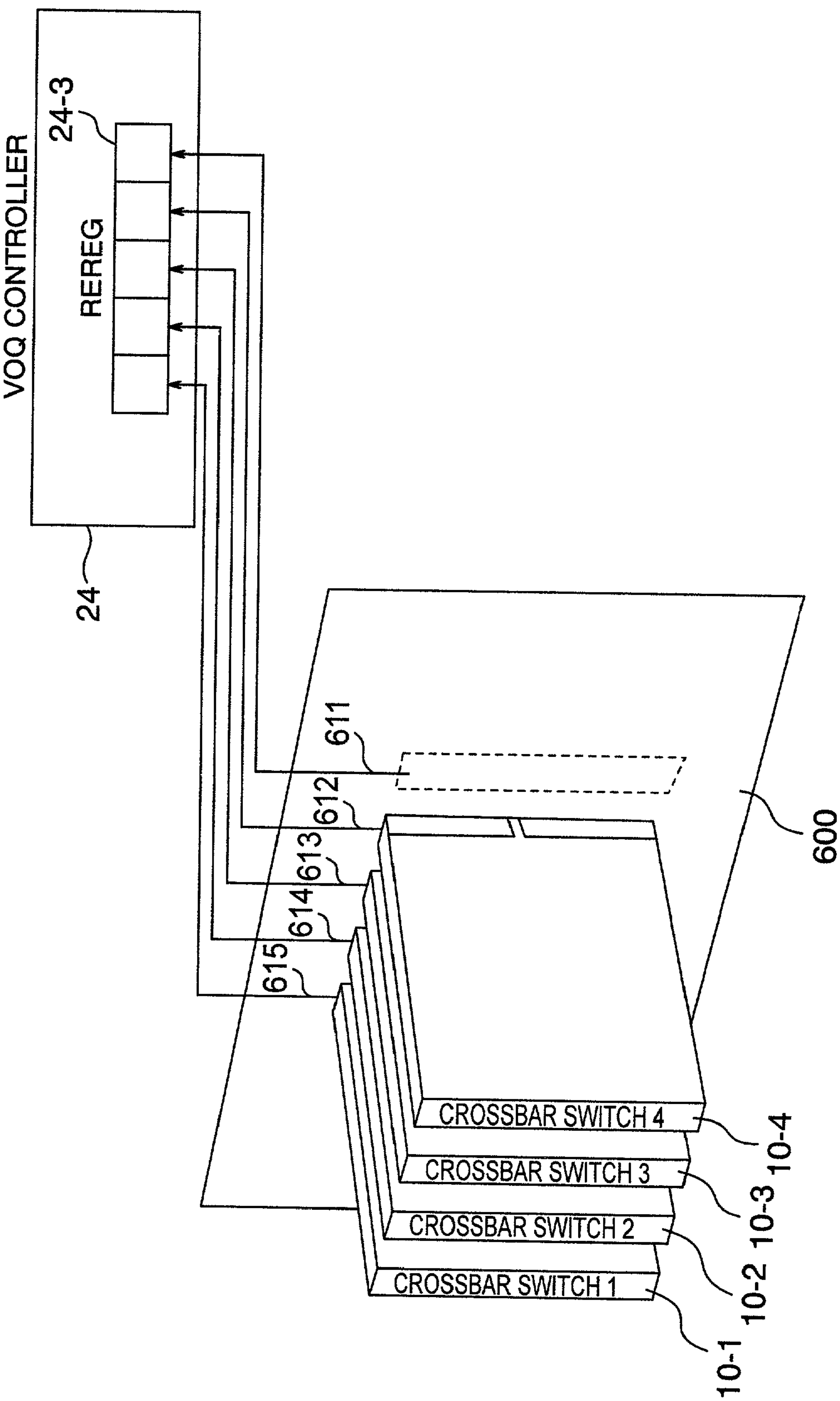
FIG. 29 is a block diagram showing one structure of a line interface card (input side) in a packet communication apparatus according to one embodiment of the present invention.

Referring back to FIG. 3, the VOQ controller 24 contains a read enable register (REREG) 24-3. Respective bits of this register correspond to the crossbar switch planes 10-1~10-5. When some register bits are set to "1" blocks are sent to the corresponding crossbar switch planes of 10-1~10-5. When a certain register bit is set to "0", a block is not sent to the corresponding one of the crossbar switch planes of 10-1~10-5. The REREG 24-3 is set by the controller 60 through a microprocessor 28. Or, the REREG 24-3 may be so configured as to be set autonomously based the mounted condition of the crossbar switch planes of 10-1~10-5. For the purpose of this, as shown in FIG. 29, a switch system may be configured so that when the back panel 600 detects any addition or removal of crossbar switches 10-1~10-5, information about a change in the mounting condition is transmitted through hard lines 611~615 and directly set to the REREG 24-3. FIG. 29 shows that the crossbar switches 10-1~10-4 are mounted to the back panel 600 and the crossbar switch plane 10-5 is not mounted. When the VOQ controller 24 issues a Read command to one of the VOQs 23-1~23-*n* through a read address RA 24-2, the VOQ controller 24 supplies information about routing related to that VOQ to a block header inserter 27 through a control line 24-4 (A method of selecting VOQs 23-1~23-*n* will be described later.) Further, the VOQ controller 24 notifies the packet storage state of the block generating VOQs to an ARB-REQ generator 26 through a control line 24-5. The ARB-REG generator 26 generates send-request information about the VOQs 23-1~23-*n* from the received information and supplies the send-request information to the block header inserter 27 through a control line 26-1. The VOQ controller 24 decides whether to read blocks from a selected one of VOQs 23-1~23-*n* according to the set state of the REREG 24-3 at time slots corresponding to the crossbar switch planes 10-1~10-5. In this embodiment, a maximum of five blocks can be read continuously. A plurality of blocks (five at most) that are read continuously by a Read command from the VOQ controller 24 shall be hereafter referred to as a block group. Blocks read from a VOQ 23 are added with a block header by the block header inserter 27. Detail of a block header is illustrated in FIG. 10. The block header 201 added to block data 202 includes BLK 201-1 indicating a type of block (valid block/invalid block/other special blocks), QOS 201-2 indicating a quality class, an RTG 201-3 indicating destination information, IFNo 201-4, REQ 201-6 indicating an output request of VOQ 23, SEQ 201-7 sequentiality check, and a reserve area RES 201-5.

Figure 5:
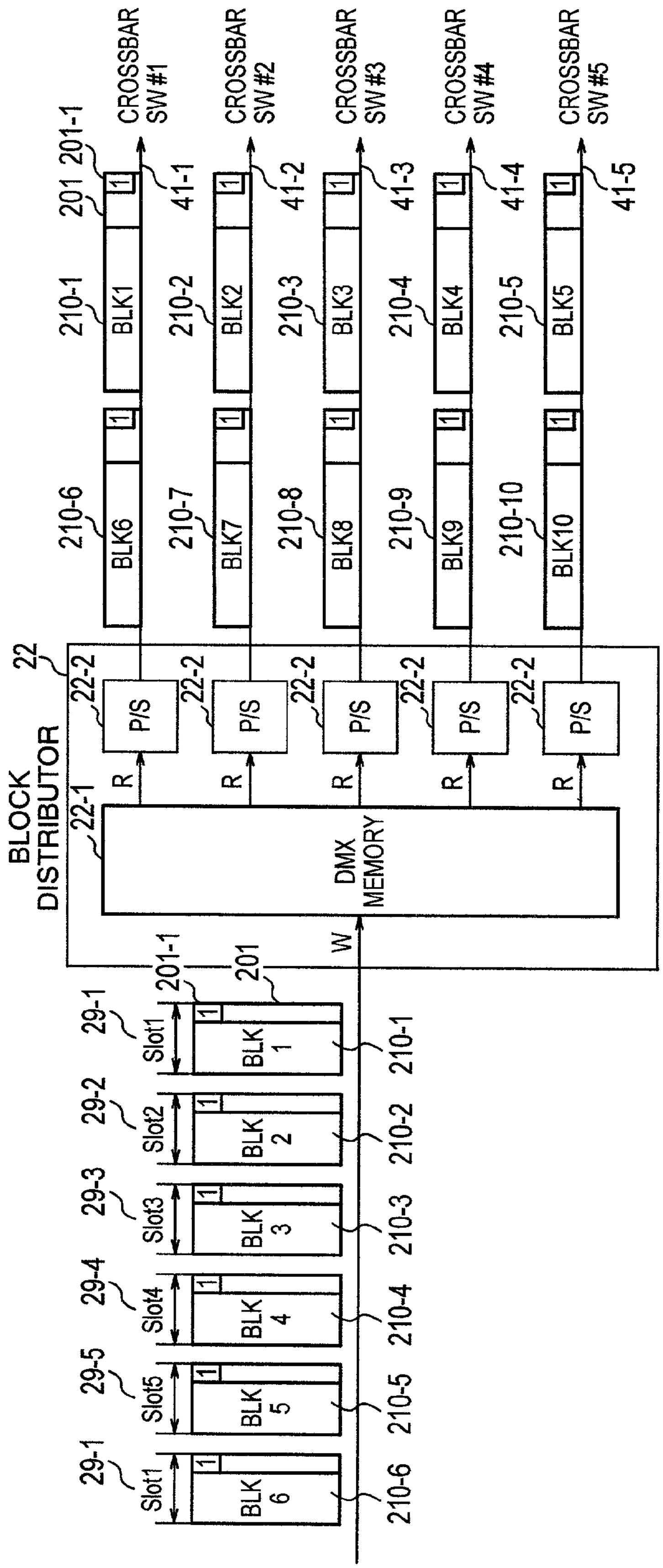
FIG. 5 is an explanatory diagram showing the operation of a block distributor in a packet communication apparatus according to one embodiment of the present invention.
Figure 6:
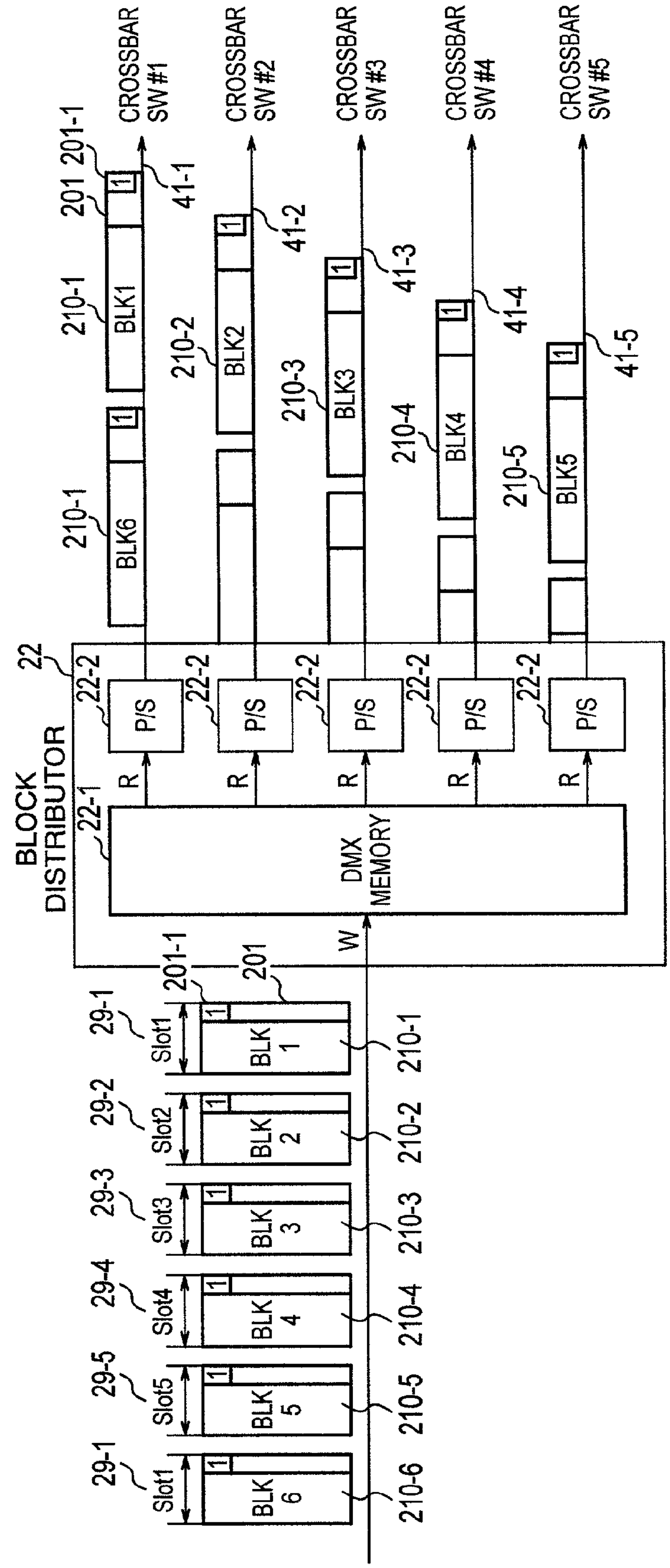
FIG. 6 is an explanatory diagram showing the operation of a block distributor in a packet communication apparatus according to one embodiment of the present invention.
Figure 7:
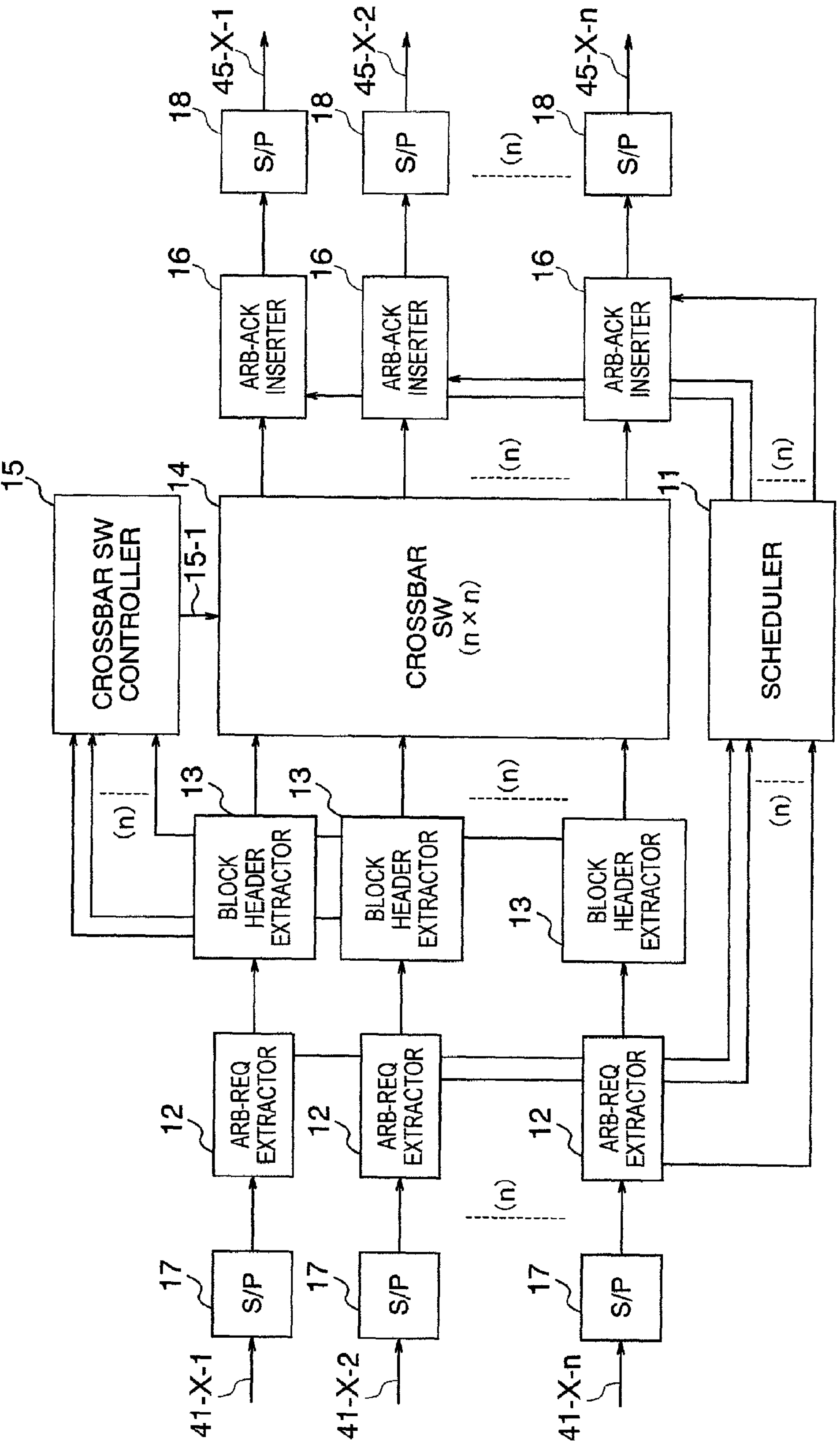
FIG. 7 is a block diagram showing the operation of a crossbar switch of a packet communication apparatus according to one embodiment of the present invention.
Figure 25:
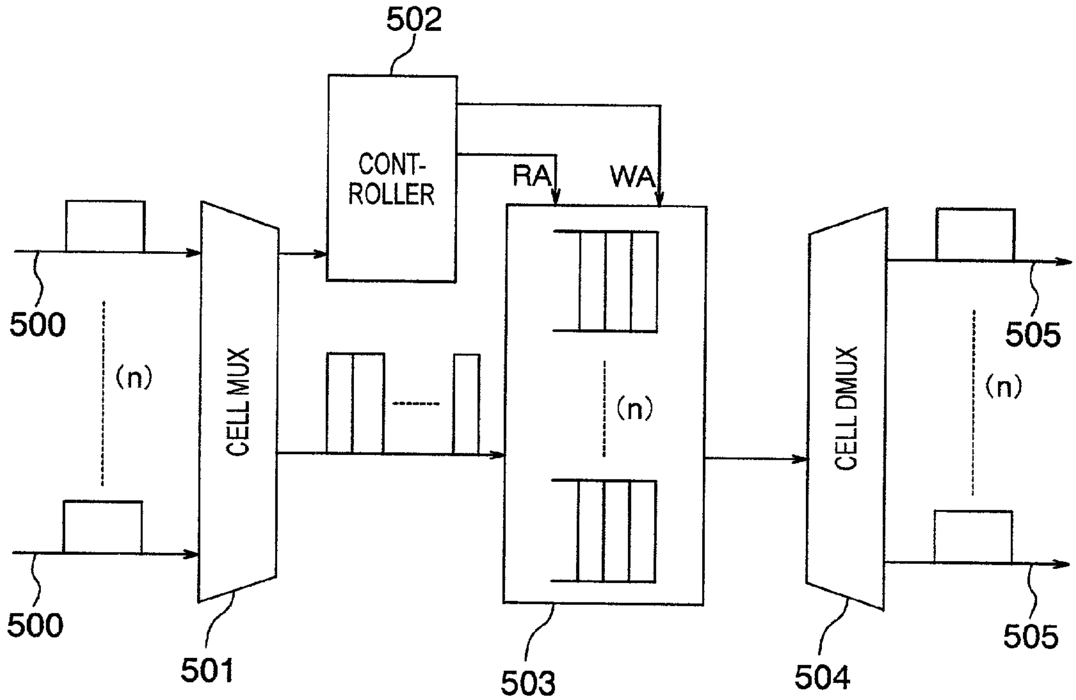
FIG. 25 is a block diagram of a packet switch having a buffer memory in prior art.
Figure 26:
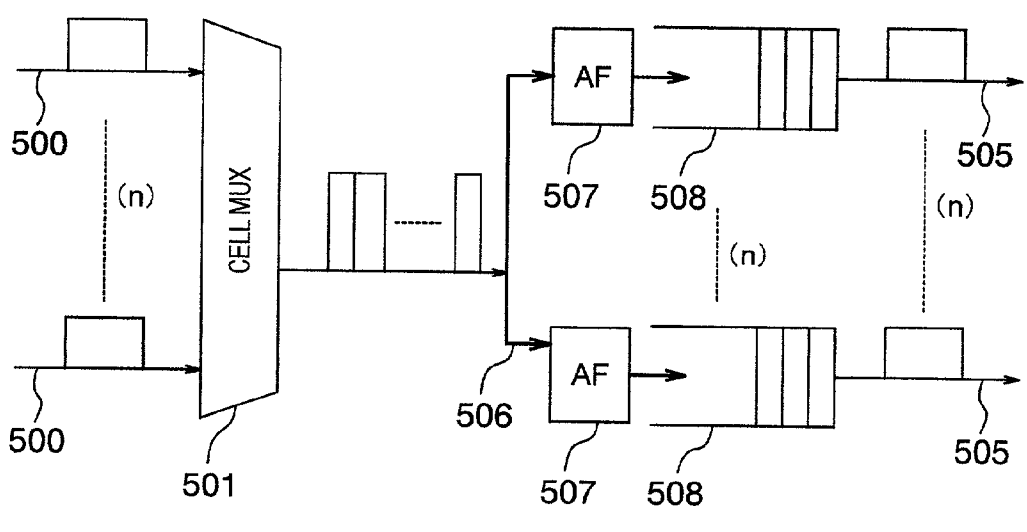
FIG. 26 is a block diagram of a packet switch having a buffer memory in prior art.
Figure 27:
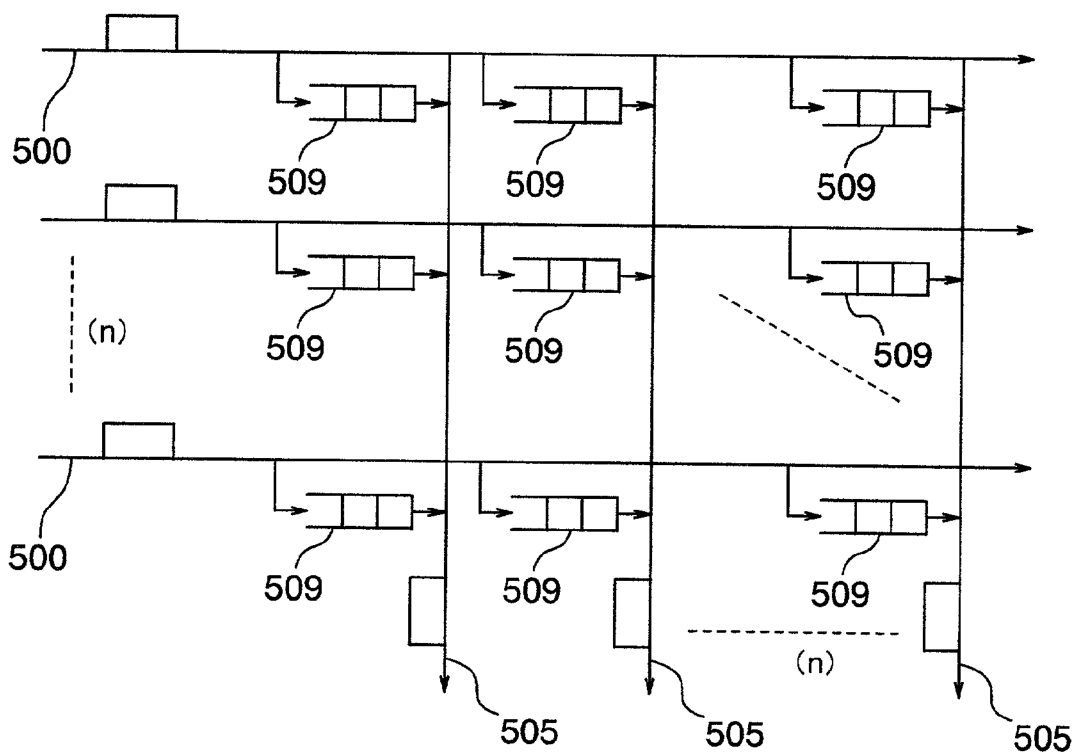
FIG. 27 is a block diagram of a packet switch having a buffer memory in prior art.
Figure 28:
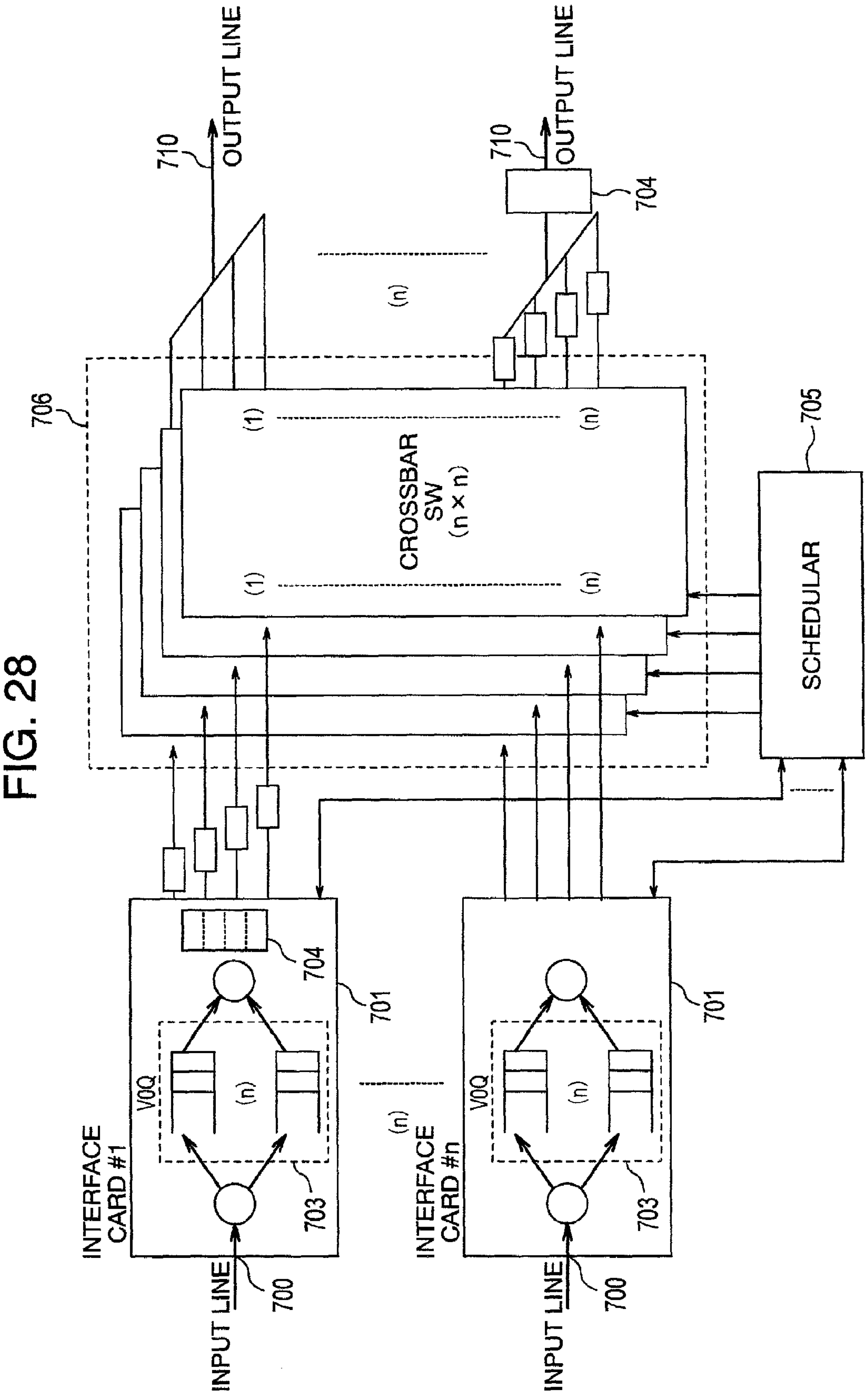
FIG. 28 is a block diagram of a large-capacity packet switch in prior art.

Referring to FIG. 5, description will be made of how blocks are sent out at respective time slots and how the block distributor functions. In FIG. 5, there are provided cyclic time slots 29-1~29-5, which correspond to the crossbar switch planes 10-1~10-5. Five time slots form one cycle in this embodiment. The VOQ controller 24 controls so that blocks 210-1~210-5 should be read at the respective time slots. At time slot 29-1 corresponding to the crossbar switch plane 10-1 in the next cycle, a block 210-6 is read. Each block is added with a block header 201 and "1 (valid)" is set in BLK 201-1 to indicate the type of block. If there is not a block to be read in a selected block generating VOQ (one of 23-1~23-*n*), "0 (invalid)" is set in BLK 201-1 and idle blocks are sent out. Though not shown in FIG. 5, the same block header 201, except for SEQ 201-7, is written in the area of block header 201 of the blocks read out continuously from the VOQ (one of 23-1~23-*n*) in one cycle of five time slots (in other words, valid blocks belonging to the same block group). In the area of SEQ 201-7, a value that changes successively each time a valid block is sent out is written by the block header inserter 27. Blocks input in the block distributor 22 are stored successively in the DMX (demultiplex) memory 22-1, and the blocks are read successively by adjusting timing so that the blocks corresponding to the time slots 29-1~29-5 can be sent to the corresponding crossbar switch planes 10-1~10-5 at the same time. Subsequently, the blocks are converted into a serial signal by P/S (parallel/serial) converters 22-2, and then sent to the links 41 connected to the crossbar switches 10. Though the output phases of blocks sent to the crossbar switches are matched in FIG. 7, the blocks may be sent out to the crossbar switch planes 10-1~10-5 with the output phases shifted with respect to one another as shown in FIG. 6 to reduce the memory capacity of the DMX memory 22-1 or to reduce delay times. Blocks are output from the block distributors 22 of the line interface 20-1~20-*n*, and input to the crossbar switches 10 through the connection links 41-*x*-1~41-*x*-*n* (x denotes one of plane numbers 1 to 5 of the crossbar switches). The structure of the crossbar switch 10 will be described. The input blocks are converted into parallel signals by the S/P (serial/parallel) converters 17. Then, each subsequent ARB-REQ (arbitration request) extractor 12 extracts a send request REQ 201-6 in the block header 201 and sends it to the scheduler 11. After this, each block header extractor 13 extracts destination information RTG 201-3 from the block and sends it to a crossbar controller 15. The crossbar controller 15 sends a command through a control line 15-1 to the crossbar 14 directing it to switch incoming blocks to corresponding output ports according to destination information RTG 201-3. Note that it is not necessary to provide queue buffers for prevention of an output collision because scheduling is performed so that blocks to be input at the same timing have different destination information RTG 201-3. This means that the crossbar switches 10 need not have a buffering means as in the conventional shared buffer type switch (FIG. 25), output buffer type switch (FIG. 26) and crosspoint buffer type switch (FIG. 27). Therefore, even when crossbar switches 10 are arranged in parallel, there is no need to provide means to synchronize all the crossbar switches 10-1~10-5. The scheduler 11 grasps the state of the block generating VOQ 23 of each line interface 20 from the contents of REQ 201-6, and decides in advance the optimum input/output connections among the line interfaces 20 by a scheduling algorithm. The scheduler 11 gives read permissions (arbiter acknowledge) to the block generating VOQs 23-1~23-*n* in each line interface 20 at the next timing. The ARB-ACK inserters 16 add read permissions to the block headers when blocks output from the crossbar 14.

Figure 11:
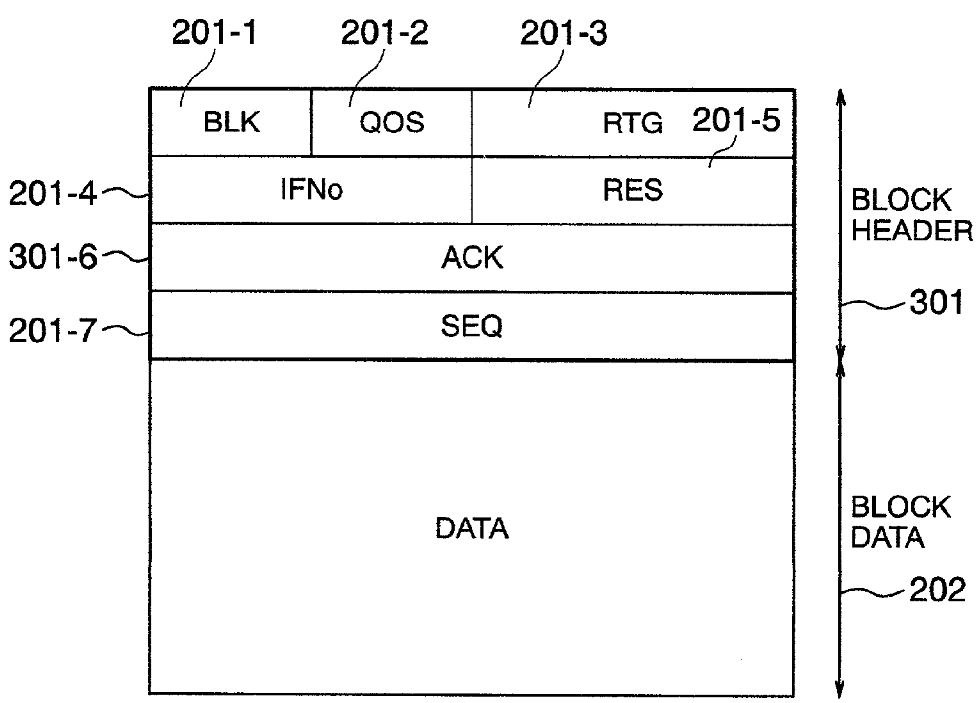
FIG. 11 shows an example of a block format used in a packet communication apparatus according to one embodiment of the present invention.

FIG. 11 shows a block format on the output side of the crossbar 14. As shown in FIG. 11, arbiter acknowledge (ACK) 301-6 is added by overwriting in the area of REQ 201-6 (FIG. 10) in the block header 301. Then, the blocks are converted into a serial signal by the P/S (parallel/serial) converter 18 and sent to the line interfaces 20-1~20-*n* through the connection links 45-*x*-1~45-*x*-*n* (x indicates one of the plane numbers 1 to 5 of the crossbar switch planes 10).

Figure 8:
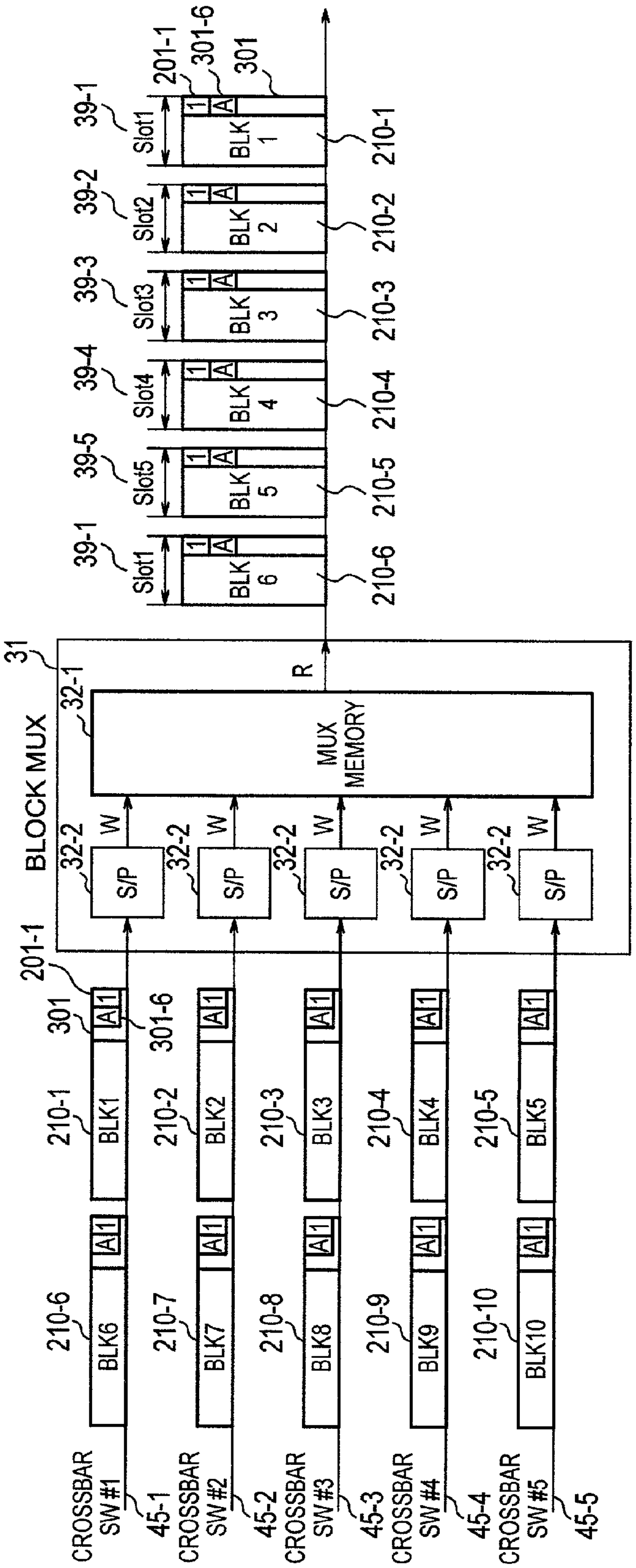
FIG. 8 is an explanatory diagram showing the operation of a block multiplexer of a packet communication apparatus according to one embodiment of the present invention.

Again referring to FIG. 3, description will be made of the function and action of the output side of the line interface 20. Blocks switched by the crossbar switch planes 10-1~10-5 are input through the connection links 45-1~45-5 into the line interface 20, and time-division-multiplexed by the block multiplexer 31. FIG. 8 shows the action of the block multiplexer 31. The blocks input into the block multiplexer 31 are converted into parallel signals by the P/S (parallel/serial) converters 32-2, and then stored in a MUX memory 32-1. And, the blocks are read one after another with timing adjusted so that blocks are sent serially to the slots 39-1~39-5 corresponding to the crossbar switch planes 10-1~10-5.

FIG. 8 shows a case where blocks 210-1~210-5 from the crossbar switch planes 10-1~10-5 are read at the corresponding time slots 39-1~39-5. After this, the ARB-ACK extractor 36 extracts, from the blocks, ACK 301-6 as a read permission command to the block generating VOQs 23-1~23-*n*. In this embodiment, five crossbar switch planes 10-1~10-5 are mounted, and the same ACK 301-6 is given to all blocks belonging to the same block group (for example, blocks 210-1~210-5 in FIG. 8). In this case, however, the ARB-ACK extractor 36 has only to extract ACK 301-6 from the first block of block group. A decision of whether a block arrives at each slot is valid or invalid is judged by BLK 201-1 added to the block header 301.

Referring back to FIG. 3, information about read permission to VOQs, extracted by the ARB-ACK extractor 36, is notified through a control line 36-1 to the VOQ controller 24 and the ARB-REQ generator 26. The ARB-REQ generator 26, by using packet storage state in the block generating VOQ 23 supplied through the control line 24-5 and read permission information, generates send request information at the next timing. Thereafter, the block header extractor 37 extracts the block header 301 from the block and analyzes it. The block header extractor 37 instructs the VIQ controller 34 through a control line 37-1 to store the block in a packet regenerating VIQ (one of 33-1~33-*n*) that corresponds to the line interface 20 from which the block was input. More specifically, the block header extractor 37 transmits to the VIQ controller IFNo 201-4 indicating the line interface from which the block is input and QOS 201-2 showing quality class or information generated based on these two kinds of information. The block header extractor 37 verifies whether a block or a block group that arrived through the same line interface came in proper sequence by checking to block sequentiality check information SEQ 201-7. If any abnormality is found, the block header extractor 37 instructs the VIQ controller 34 not to write the abnormal block in the packet regenerating VIQ 33. When normal blocks arrived, the VIQ controller 34 instructs the packet regenerating VIQ 33 to write blocks that arrived by specifying write addresses (WA) 34-1.

When packets are read from the packet regenerating VIQ 33, a packet generating process is carried out so that variable length packet can be obtained from fixed length blocks stored in the queue buffer. FIG. 4 shows a case where a plurality of packets (100A~100E) are taken out from three fixed length blocks, block 1 (200-1), block 2 (200-2) and block 3 (200-3). In order to read packets from the packet regenerating VIQ 33, it is necessary to detect the boundaries of variable length packets. The boundaries of packets can be decided by reading each packet according to its own packet length information (LEN) 101-4 in packet information 101 shown in FIG. 12. Another possible method of boundary discrimination is to store bits to indicate the boundaries of packets in parallel with variable length packets in the packet regenerating VIQ 33. Variable length packets output from the packet regenerating VIQ 33 are transmitted to the output packet processor 32.

Figure 2B:
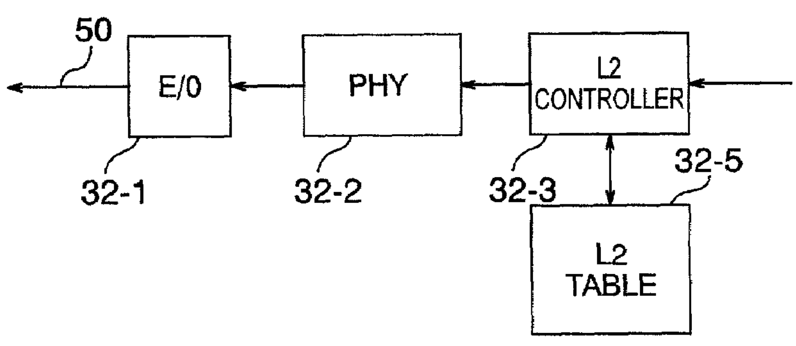
FIG. 2B is a block diagram showing a structure of a line interface card (output side) of a packet communication apparatus according to one embodiment of the present invention.
Figure 9:
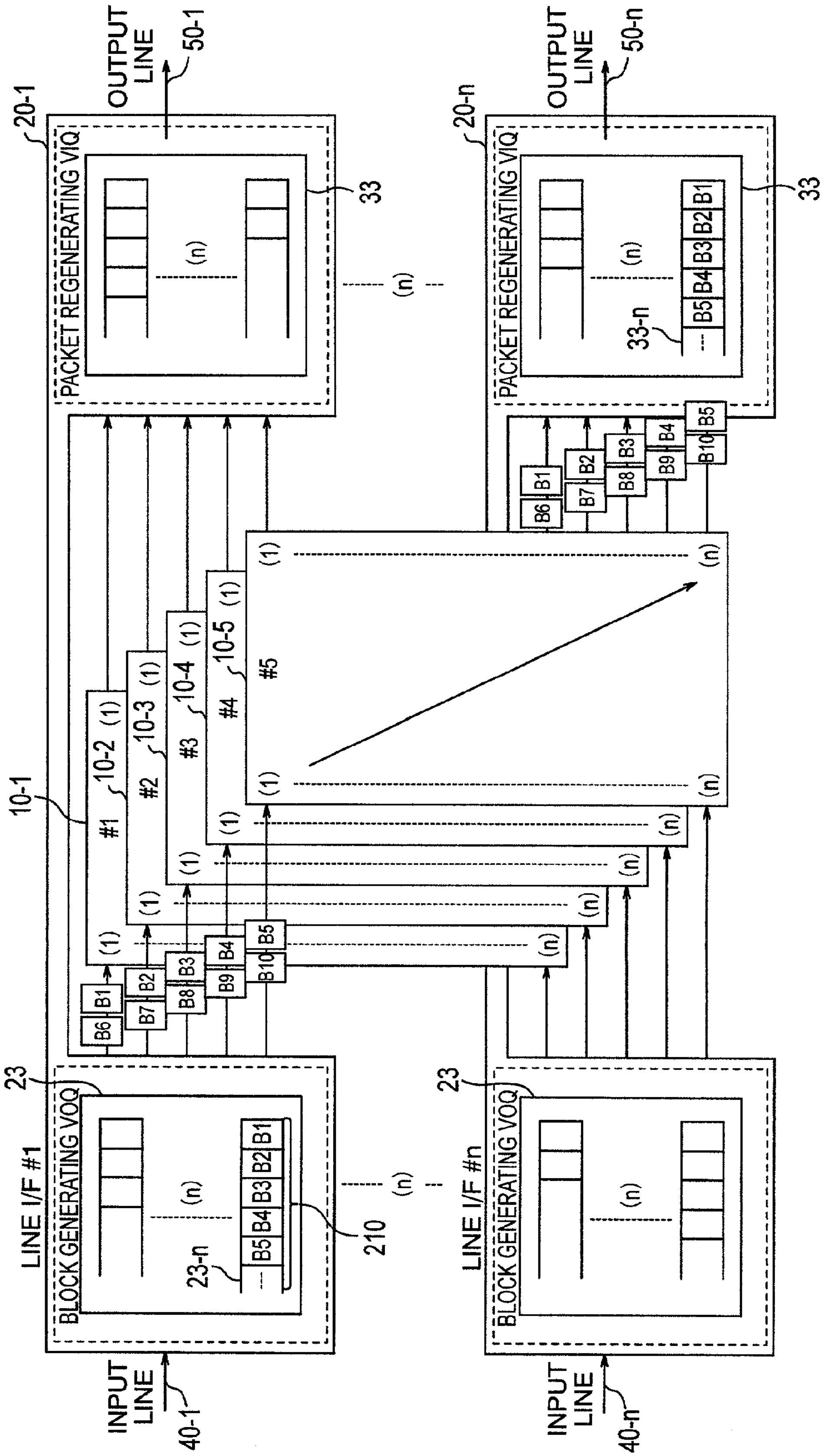
FIG. 9 is an explanatory diagram of block flow in a packet communication apparatus according to one embodiment of the present invention.

FIG. 2B shows the structure of the output packet processor 32. The input packets are subjected to a layer 2 processing in the L2 processor 32-3. For example, if the output line is an Ethernet, the above processing searches the next hop IP addresses as IP addresses of next nodes to obtain a layer 2 address (MAC address) of the next router to connect to, and gives this address to the packets. The L2 TABLE 32-5 contains relation between next hop IP addresses and layer 2 addresses of next routers to connect to. After the layer 2 processing, PHY 32-2 performs mapping on variable length packet on SONET framing structure. After this, electrical/optical (E/O) converter 32-1 converts the packet into an optical signal and sends the signal out onto the output line 50. FIG. 9 shows switching of blocks when the crossbar switches 10-1~10-5 of the packet communication apparatus are all in operation.

Figure 13:
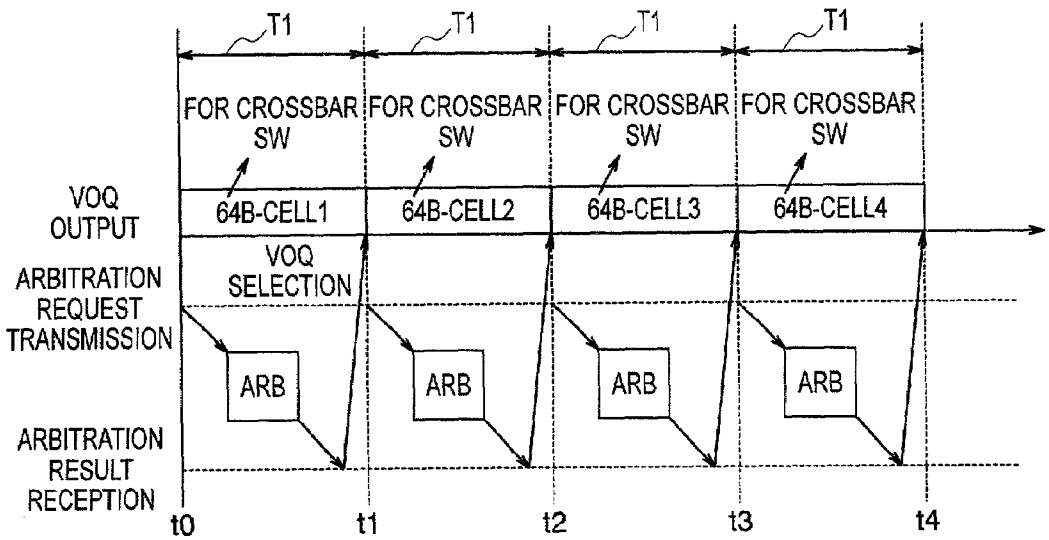
FIG. 13 is a time chart showing arbitration cycles in a conventional packet communication apparatus.
Figure 14:
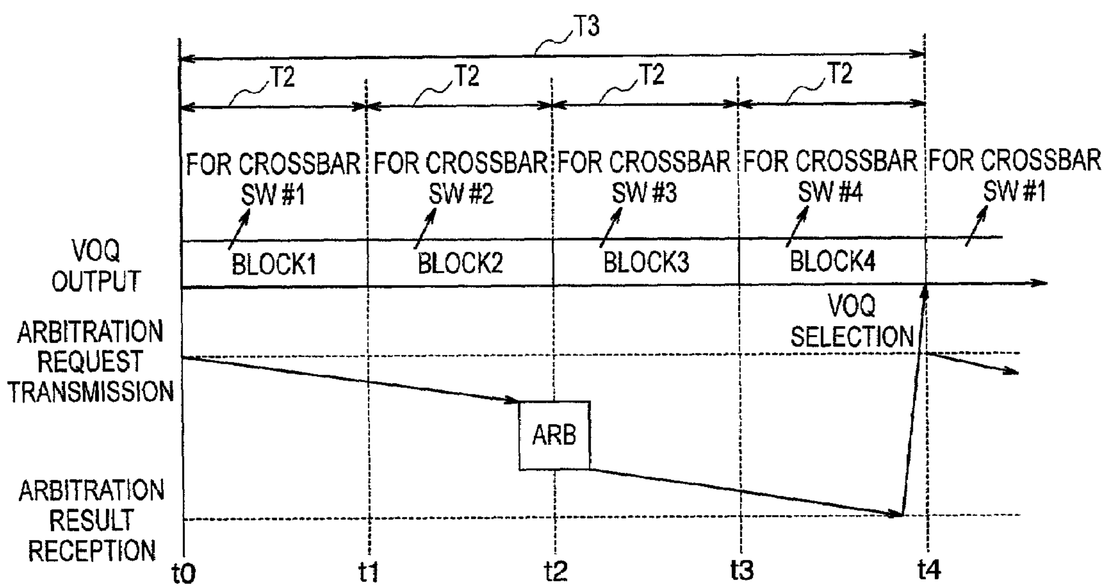
FIG. 14 is a time chart showing arbitration cycles in a packet communication apparatus according to one embodiment of the present invention.
Figure 15:
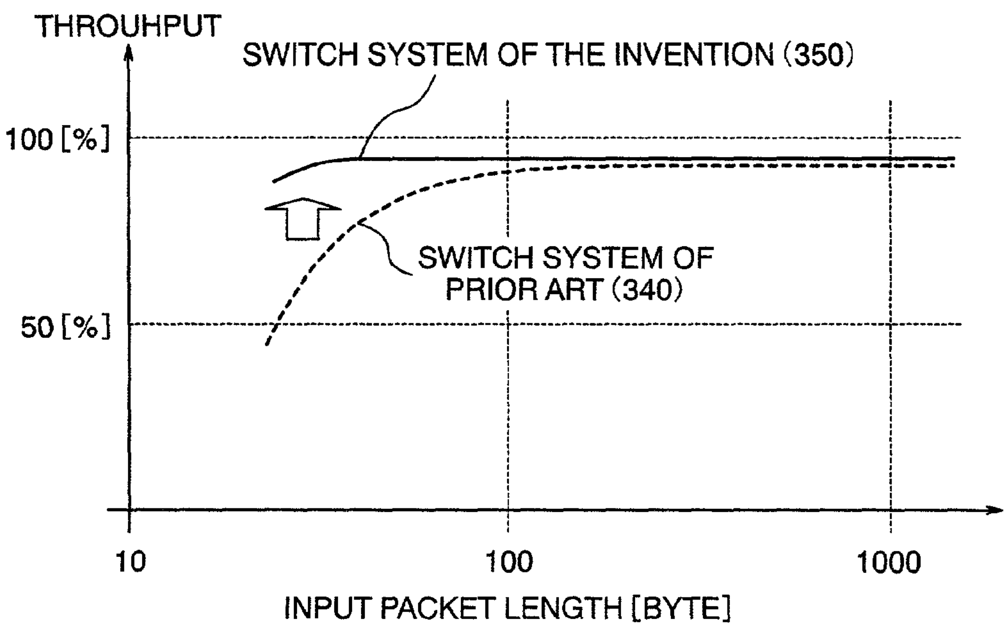
FIG. 15 is an explanatory diagram showing effects of block generation in a packet communication apparatus according to one embodiment of the present invention.

As described above, in the packet communication apparatus according to one embodiment of the invention, packet data is transferred between a plurality of line interfaces 20 across the crossbar switches 10 is performed in a block format, the time constraint in the arbitration process to decide connection relationship between the input and output ports is alleviated. FIG. 13 shows an example of conventional arbitration time in cell units and FIG. 14 shows an example of arbitration time in block group, consisting of a number of fixed length blocks (this number is four in the example in FIG. 14). Supposing that the length of one cell (T1 as converted into time) in FIG. 13 and the length of one fixed length block (T2 as converted into time) are the same, it takes T1 to transmit a send request and receives an arbitration result in the conventional method, which is equal to one cell length time, whereas it takes T3 in one block group unit, which is four times longer than T1. According to this result, this embodiment of the invention alleviates the arbitration time constraint which is an obstacle in constructing a large capacity switch. If, hereafter, a larger capacity packet communication apparatus that accommodates much higher speed lines is to be configured, this is made possible by expanding the block length or by increasing the number of switch planes to increase the number of blocks to be read at a time. Therefore, it becomes possible to build a enlarged-capacity packet communication apparatus capable of achieving high throughput even when receiving successive short packets. FIG. 15 compares the throughput characteristics of the conventional switch system in cell units (340) with the throughput characteristics of a switch system in fixed-length block units according to the present invention (350). In the switch system in fixed-length block units according to this embodiment of the present invention, inefficiency factors are less likely to occur, such as insertions of stuff bytes or limited arbitration time. Therefore, high throughput characteristics can be achieved even when short packets are input successively.

Figure 16:
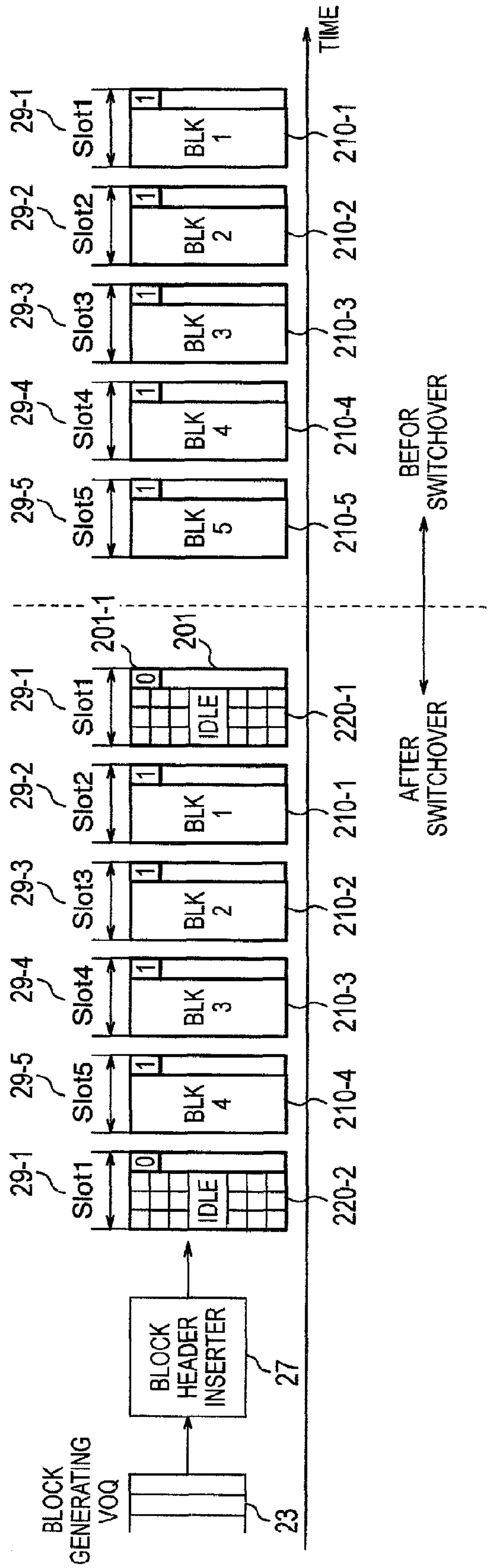
FIG. 16 is a time chart showing an example of crossbar switch change-over in a packet communication apparatus according to one embodiment of the present invention.

Description will now be made of a procedure carried out when a fault occurs in one of five planes of crossbar switches 10-1~10-5 (a crossbar switch 10-1, for example). When a fault occurs in the crossbar switch 10-1, the crossbar switch 10-1 sends a fault notification to the controller 60 through the control bus 60-1. On receiving this notification, the controller 60, via the control bus, sets the bit "0", which corresponds to the crossbar switch 10-1, in the read enable register (REREG) 24-3 in the VOQ controller 24 at each of the line interfaces 20-1~20-*n*. Thereafter, the VOQ controller 24, at time slot 29-1 corresponding to the crossbar switch 10-1, does not read a block from the block generating VOQ but sends an IDLE block 220. When adding a header, the block header inserter 27 sets "0 (invalid)" in BLK 201-1 (block type identifier) of the block header 201 corresponding to the crossbar switch 10-1. FIG. 16 shows the blocks being sent out at the respective time slots after the bit in the REREG 24-3, which corresponds to the crossbar switch 10-1, has been changed over to "0". After this change-over, at time slot 29-1 corresponding to the crossbar switch 10-1, an IDLE block is read out, and after blocks go through the block distributor 32, only IDLE blocks 220 are sent to the crossbar switch 10-1.

Figure 17:
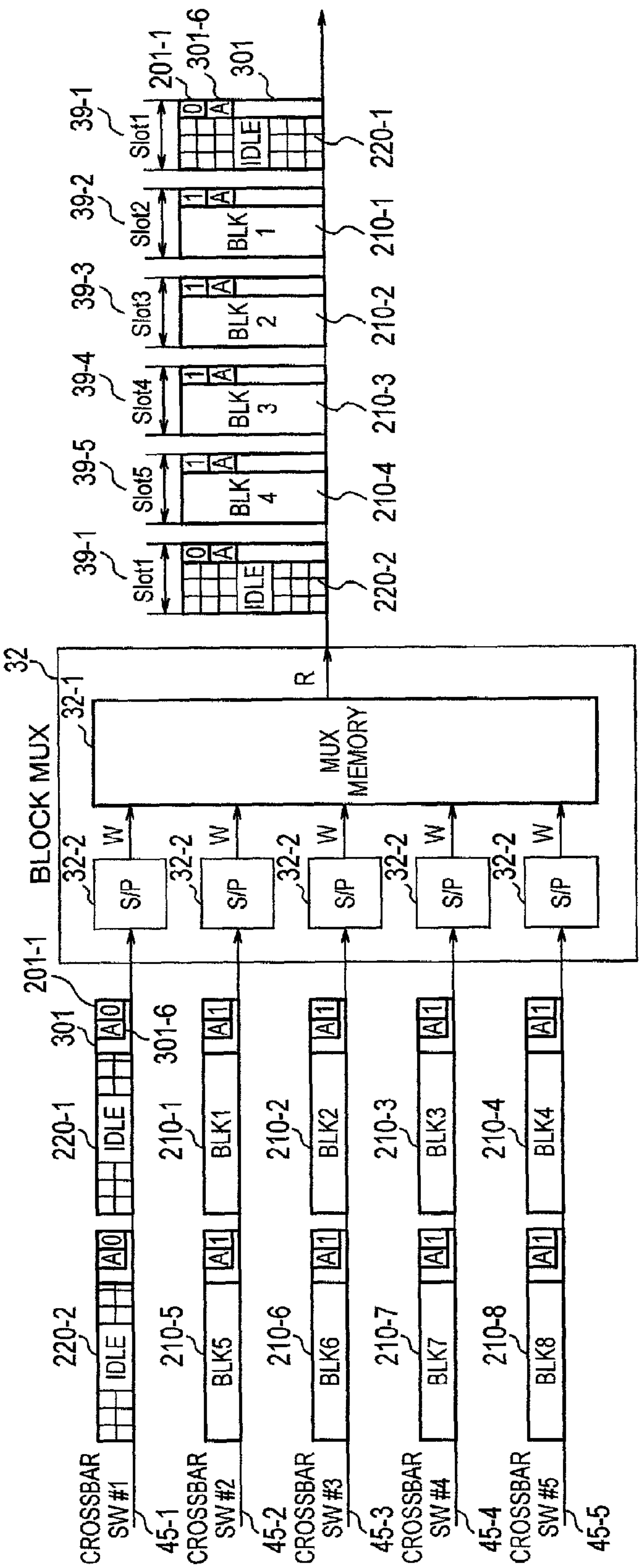
FIG. 17 is an explanatory diagram showing the operation of a block multiplexer in a packet communication apparatus according to one embodiment of the present invention.

FIG. 17 shows how the blocks are input from the crossbar switches 10-1~10-5 and pass through the block multiplexer 32 on the output side of the line interface 20. The crossbar switch 10-1 supplies only IDLE blocks to the line interface 20. After blocks pass through the block multiplexer 32, at every time slot 39-1 corresponding to the crossbar switch 10-1, an IDLE block 220 is input to the crossbar switch 10-1. Referring back to FIG. 3, the block header extractor 37, when detecting an IDLE block 220, orders the VIQ controller 34 not to store an IDLE block in the packet regenerating VIQ 33 but to store valid blocks only in the packet regenerating VIQ 33.

Figure 18:
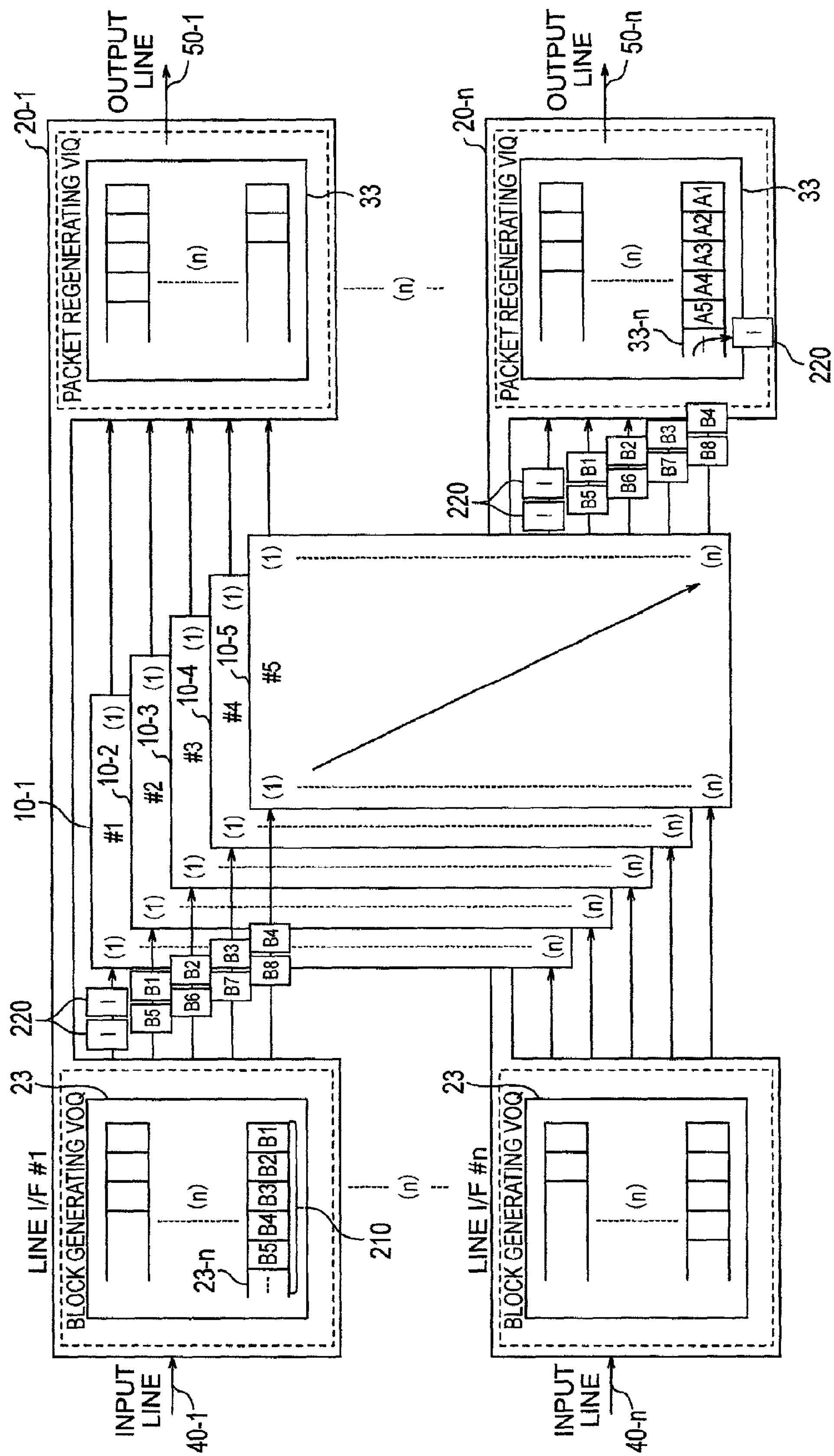
FIG. 18 is an explanatory diagram of block flow when changing over the crossbar switch in a packet communication apparatus according to one embodiment of the present invention.

FIG. 18 shows switching of blocks in the packet communication apparatus with the crossbar switch 10-1 unused. By the above procedure, it becomes possible to perform switching the crossbar switches 10-2~10-5 without the crossbar switch 10-1 where a fault has occurred. As described above, so long as four switches out of the five switches installed are operating normally, this packet communication apparatus suffers no deterioration in the switching performance, such as internal blocking of input traffic, nor does it cause any effect on communication service. In other words, the fifth switch may be regarded as an redundant capacity. In the packet communication apparatus according to this embodiment, the redundant switch capacity may not leave unused in normal operation. In other words, by keeping the redundant switch capacity in operation, it is possible to keep the whole switch in "hot standby" state, thereby ensuring high reliability. Unlike in a full redundancy configuration, in which a duplicate of data input into protection switching system, it is possible to use redundant switch for an extra capacity. Therefore, the internal switch speed can be made 1.25 times faster, during a normal operation condition, than otherwise, resulting in a switch with enhanced throughput characteristics. Moreover, by having the switch as an additional capacity operating regularly, a plurality of switch planes need not be kept under master-slave management, thus making management simpler.

Figure 19:
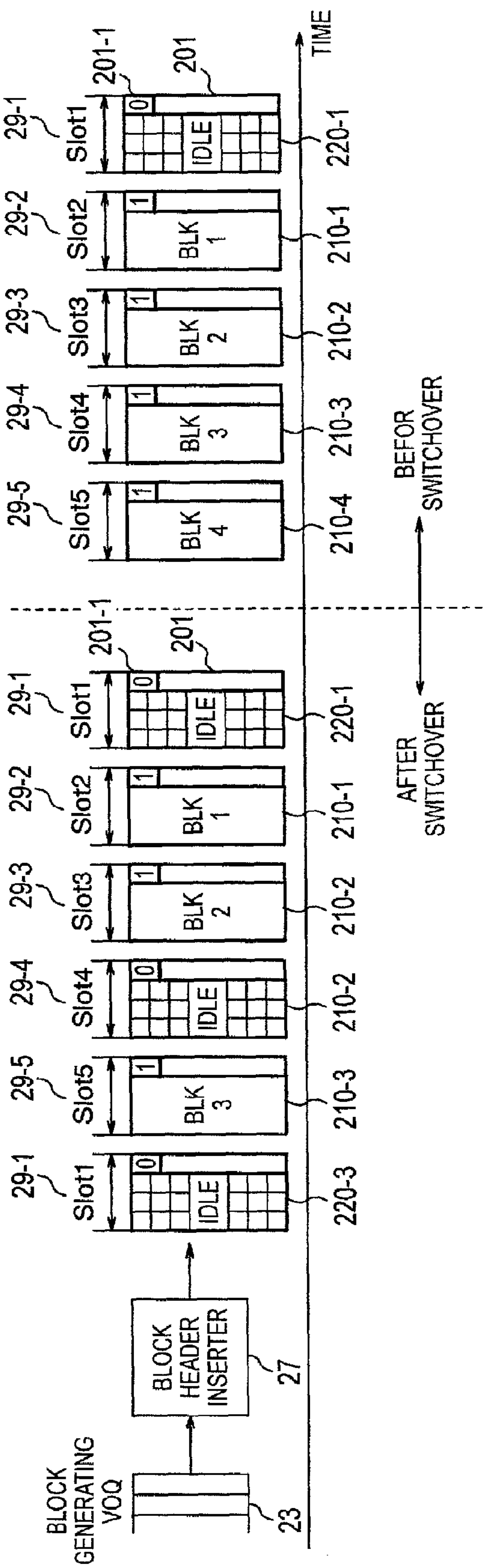
FIG. 19 is an explanatory diagram showing an example of crossbar switch change-over in a packet communication apparatus according to one embodiment of the present invention.
Figure 20:
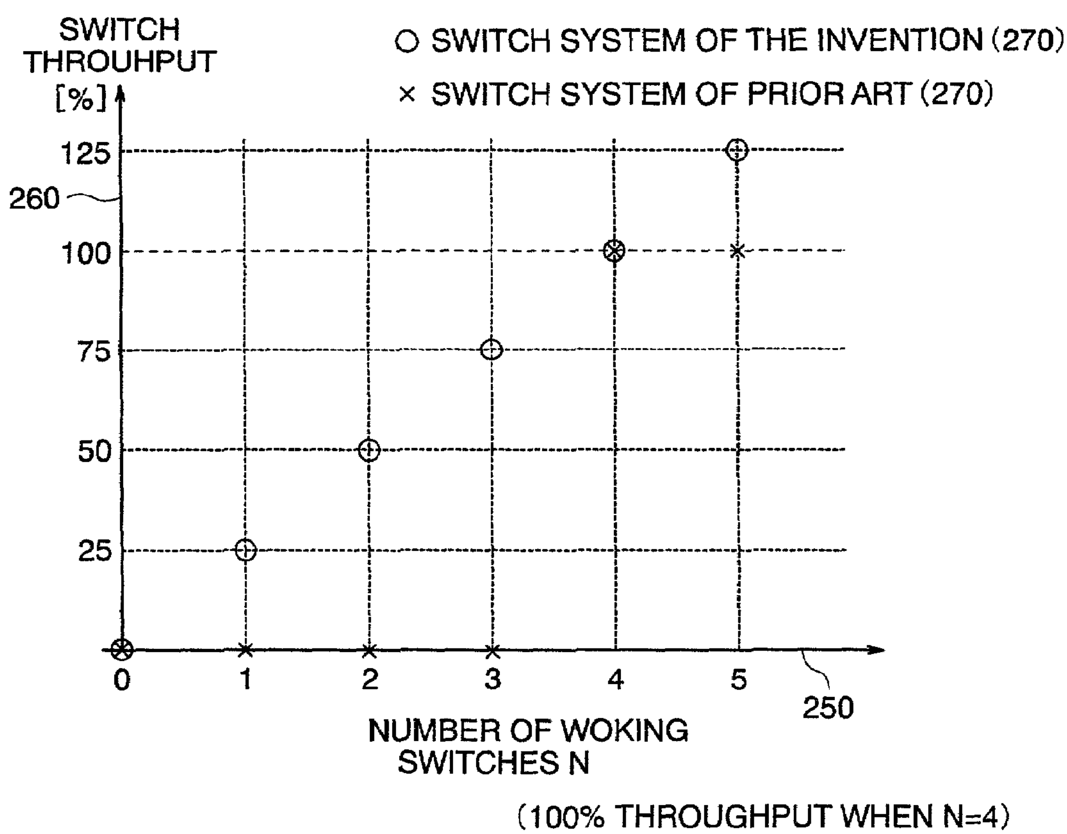
FIG. 20 is an explanatory diagram showing scalability of a packet communication apparatus according to one embodiment of the present invention.

Let us consider a case where a fault occurs in plural crossbar switches 10. Description will be made of a procedure for a case where a fault occurs in a crossbar switch (crossbar switch 10-3, for example) while one of the five crossbar switches 10-1~10-5 (crossbar switch 10-1, for example) is already suffering a fault and is kept not in use. Like in the first embodiment, when a fault occurs in the crossbar switch 10-3, the crossbar switch 10-3 sends a fault notification to the controller 60 through the control bus 60-1. In response, the controller 60, via the control bus, sets the bit "0", which corresponds to the crossbar switch 10-3, in the read enable register (REREG) 24-3 in the VOQ controller 24 at each of the line interfaces 20-1~20-*n*. (Another bit corresponding to the crossbar switch 10-1 has already been set to "0".) After this, the VOQ controller 24 does not read blocks from the block generating VOQ 23, but sends IDLE blocks 220 at time slots 29-1 and 29-3 corresponding to the crossbar switches 10-1 and 10-3. The block header inserter 27, when adding a header to a block, sets "0 (invalid)" in BLK 201-1 (block type identifier) with regard to a block header 201 corresponding to the crossbar switch 10-3. FIG. 19 shows the blocks to be sent out at respective time slots after "0" is set in that bit of the REREG 24-3 which corresponds to the crossbar switch 10-3. As in the first embodiment, only IDLE blocks 220 are sent to the crossbar switches 10-1 and 10-3. It is understood that blocks can be distributed by avoiding the faulty crossbar switches 10-1 and 10-3. If more fault occurs in the crossbar switches 10, faulty crossbar switches can be isolated one after another by the same setting method as described above. FIG. 20 shows relation 270 between a number of working crossbar switches 250 and switch throughput 260 in a packet communication apparatus according to one embodiment of the present invention. Under the same condition that the number of crossbar switches is the same (four for required capacity, one for redundant capacity), when four switches are used as a working system and one switch is set aside as a reserved unit for protection purposes in bit-slice configuration, this reserved unit cannot be utilized in regular operation. Further, if two or more crossbar switches become faulty, service down is inevitable in conventional bit-slice configuration.

As has been described, in this packet communication apparatus according to the embodiment of the present invention, even when some crossbar switches 10 sustain a fault one after another or simultaneously, communication service is not likely to be stopped but continues to provide switching functions with a throughput proportional to the number of normal-operating crossbar switches 10. Thus, this packet communication apparatus is tough against service down and ensures high reliability.

As another embodiment, description will be made of procedures for inspection and maintenance, and expansion or reduction of the crossbar switches 10 operating normally. Inspection and maintenance is a required process for upgrading firmware and hardware or bug fixing. Expansion is a process for increasing the number of crossbar switches 10 mounted in order to increase the switching capacity or improve the performance of the packet communication apparatus. Reduction is a process for decreasing the number of mounted crossbar switches 10 when the network configuration is changed, for example. Inspection and maintenance or expansion or reduction should preferably be achievable without interrupting service being carried out on the packet communication apparatus.

In this embodiment, reduction procedure will be first explained. For example, a crossbar switch 10-1 is set unused to make it replaceable. As a procedure of carrying on a switching process with the crossbar switch 10-1 unused, as in the process for when a fault occurs in the first embodiment, it is only necessary to, via the control bus 60-1, set the bit "0", which corresponds to the crossbar switch 10-1, in the read enable register (REREG) 24 on the input side of the line interface 20. As has been described, so long as four out of the five switches mounted on the packet communication apparatus operate normally, the switching performance never in suffers deterioration such as internal blocking of input traffic. In other words, a decrease in throughput caused by eliminating the crossbar switch 10-1 has no effects on service degradation.

Figure 21:
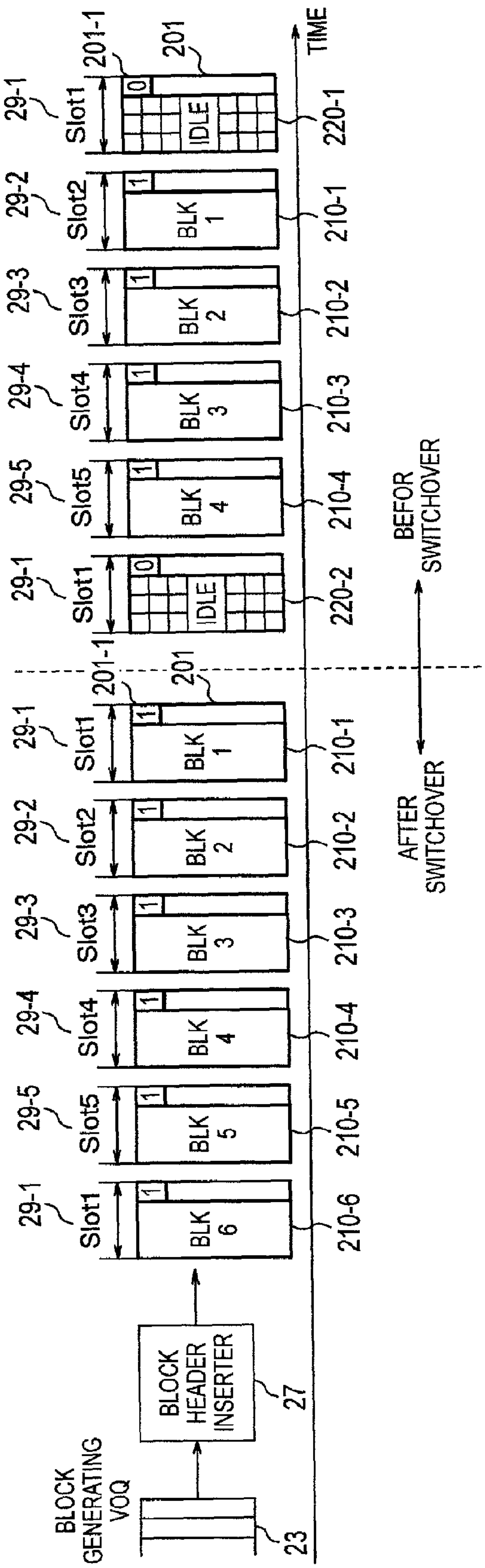
FIG. 21 is an explanatory diagram showing an example of crossbar switch change-over in a packet communication apparatus according to one embodiment of the present invention.

Next, an example of an expansion procedure will be explained. For example, a crossbar switch 10-1 is additionally installed to the operating crossbar switches 10-2~10-5. As a procedure for performing a switching process with adding the crossbar switch 10-1, it is only necessary to, via the control bus 60-1, change over the bit corresponding to the crossbar switch 10-1 from "0" to "1" in the read enable register (REREG) 24-3 in the VOQ controller 24 on the input side of the line interface 20. FIG. 21 shows the blocks being sent out at time slots after the bit corresponding to the crossbar switch 10-1 in the REREG 24-3 is changed over to "1". As a switch method for the packet communication apparatus according to the embodiments of the present invention, crossbar switches 10 are employed. This crossbar switch 10 does not require state management because this switch is not provided with buffering means as in the shared buffer type switch (FIG. 25), the output buffer type switch (FIG. 26) and the crosspoint buffer type switch (FIG. 27). In other words, when a crossbar switch is additionally installed, the crossbar switch 10 does not require complicated control means to ensure state coincidence with the existing switches.

When expanding or reducing the number of switch planes, because the REREG 24-3 needs to be configured sequentially on the line interfaces 20-1~**20-*n* on the input side thereof through the controller 60. Therefore the settings of the REREG 24-3 may differ among a plurality of line interfaces 20-1~20-*n* as transient states. In the packet communication apparatus according to this embodiment of the present invention, information as to which block slots are valid (39-1~39-5) is not held on the output side of the line interface 20. In other words, the line interface 20 does not require a state register, such as the REREG 24-3, to be provided on the output side, and whether to store packets in the packet regenerating VIQ 33 is judged based on BLK 201-1 identifier included in a block header 201. Therefore, even if the settings of REREG 24-3 differ in the line interfaces 20-1~20-*n***, an interruption of blocks or user packets never occurs.

Inspection and maintenance can be carried out without service interruption by executing reduction and expansion procedures mentioned above in this order. To be more specific, it is only necessary to execute a reduction procedure first in which only the crossbar switch 10-1 set to out-of-service and removed. Then, after inspection or maintenance is performed for the removed crossbar switch 10-1. Finally, an expansion procedure is expected to install a maintained crossbar switch 10-1 or a new crossbar switch 10-1 is mounted. By executing reduction and expansion procedures for other crossbar switches 10-2~10-5 critically, it is possible to overhaul all of the crossbar switches without service interruption.

As has been clarified above, according to this embodiment, expansion or reduction of the system structure or inspection and maintenance can be performed easily with a smaller amount of hardware than in a full redundancy configuration and these are performed without service interruption. The packet communication apparatus according to this embodiment of the present invention has linear scalability such that switch capacity is proportional to the installed switch planes.

Figure 22:
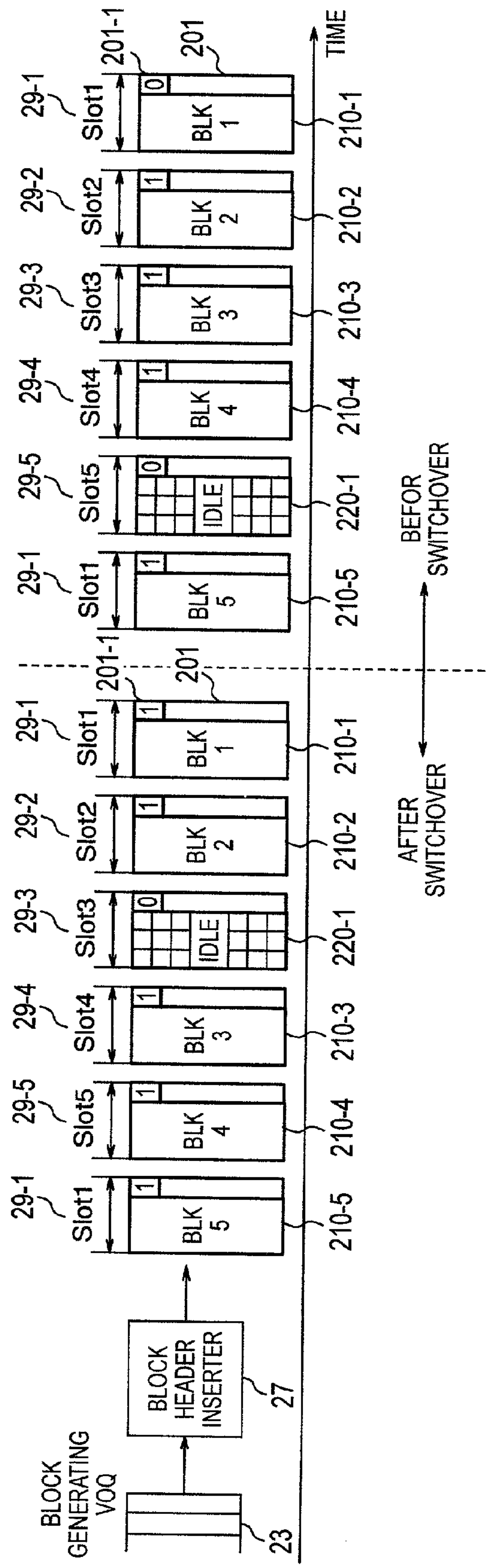
FIG. 22 is an explanatory diagram showing an example of crossbar switch change-over in a packet communication apparatus according to one embodiment of the present invention.

To introduce a still further embodiment, a change-over procedure will be explained in which one of the crossbar switches 10-1~10-5 is set to a redundant switch plane in advance. In this embodiment, five crossbar switches 10-1~10-5 are mounted on a packet communication apparatus and one crossbar switch 10-5 is set to a redundant switch plane. More specifically, at system initialization, "0" is set to the bit which corresponds to the crossbar switch 10-5 in the read enable register (RERREG) 24-3 of all line interfaces 20-1~**20-*n*, and "1" is set to the other bits. For example, when a failure occurs in the crossbar switch 10-3, first the crossbar switch 10-3 notifies the failure to the controller 60 via the control bus 60-1. Then, the controller 60 sets the bit "0" which corresponds to the crossbar switch 10-3, and sets the bit "1" corresponding to the crossbar switch 10-5 in the read enable register (REREG) 24-3 in the VOQ controller 24 of all the line interfaces 20-1~20-*n*. After the configuration is changed, the VOQ controller 24 does not read blocks from the block generating VOQ at time slot 29-3 corresponding to the crossbar switch 10-3 where a failure occurred but sends IDLE blocks 220 at this time slot. The VOQ controller 24 executes a block read processing at other time slots 29-1, 29-2, 29-4 and 29-5. FIG. 22 shows the blocks being sent out at respective time slots after the bit corresponding to the crossbar switch 10-3 has been changed over to "0" and the bit corresponding to the crossbar switch 10-5 has been changed over to "1" in the REREG 24-3**.

Figure 23:
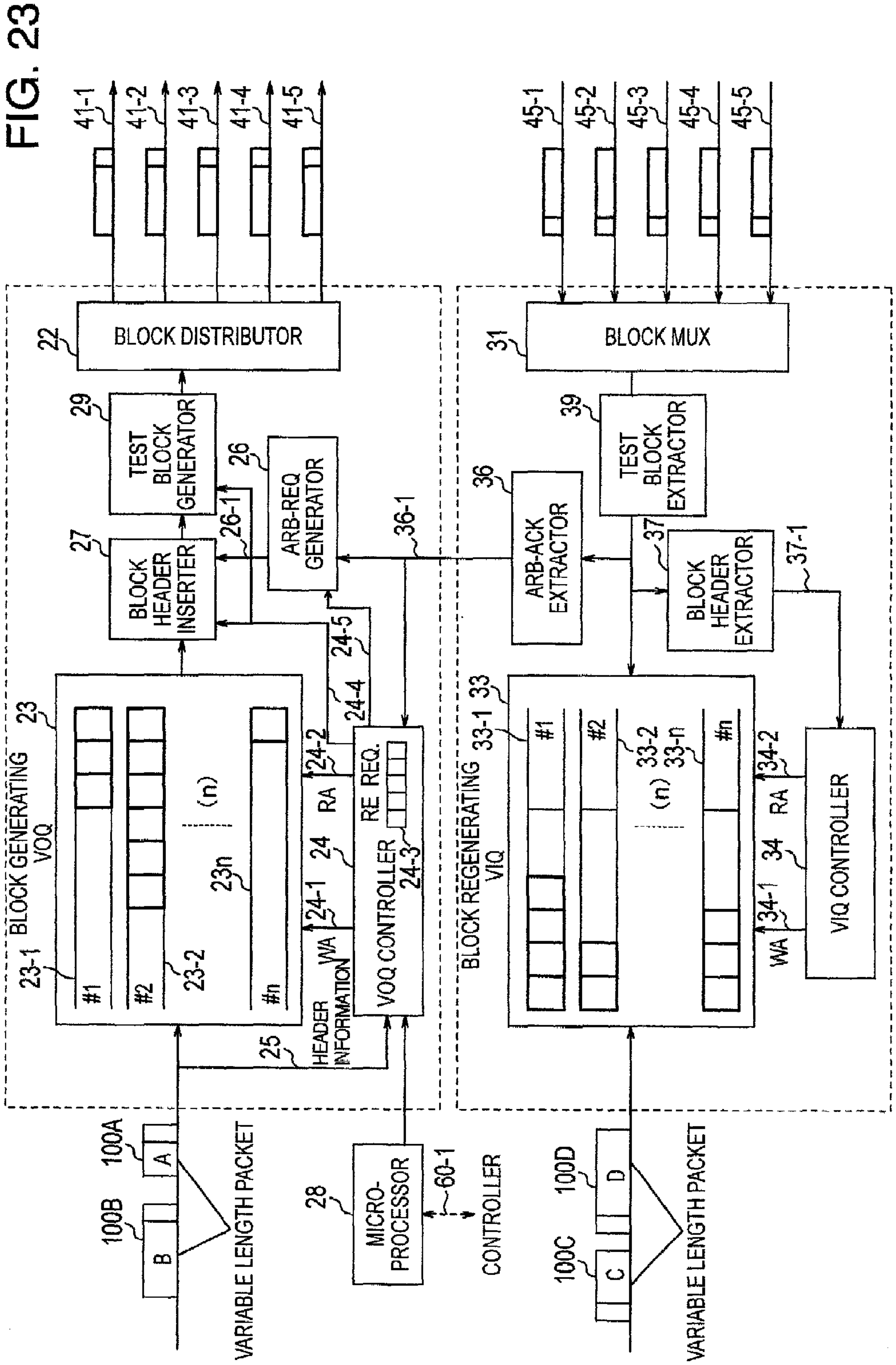
FIG. 23 is a block diagram showing another structure of a line interface card in a packet communication apparatus according to one embodiment of the present invention.

In a switching system having a redundant system, providing a conductivity test means for a redundant system improves reliability in changing over. In connection with this, FIG. 23 shows a line interface having a conductivity test means for a redundant system according to one embodiment of the present invention. In this configuration, a test block generator 29 is provided at a stage subsequent to the block header inserter 27 on the input side of the line interface 20 and a test block collector 39 is provided at a stage subsequent to the block multiplexer 31 on the output side of the line interface 20. The block header inserter 27 receives information about a redundant crossbar switch from the microprocessor 28 through the VOQ controller 24 and the control line 24-4.

Figure 24:
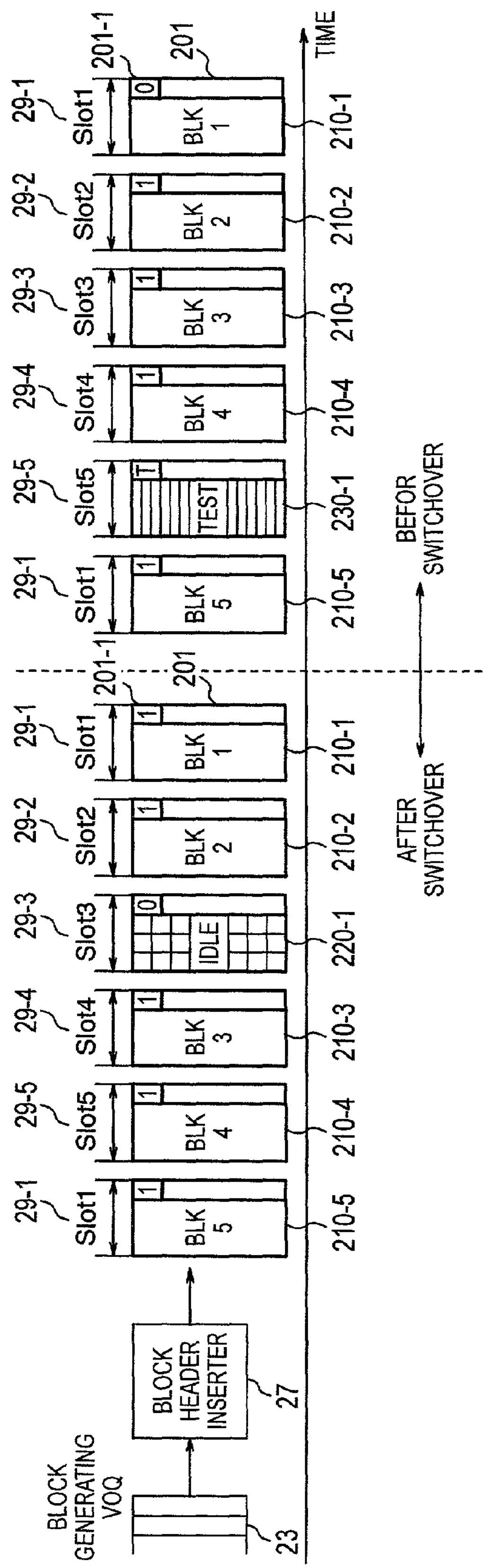
FIG. 24 is an explanatory diagram showing an example of crossbar switch change-over in a packet communication apparatus according to one embodiment of the present invention.

The block header inserter 27 set "T (test block)" to BLK 201-1 (block type identifier) in a block header 201 corresponding to the crossbar switch 10-5 (a redundant system). In the other areas, such as SEQ 201-7, of the block header, the same values as in other user data block are set. When detecting a test block from BLK 201-1, the test block generator 29 overwrites the block data field to a test block pattern. The test block pattern is a specific bit pattern set in the test block generator 29. Note that the same test block pattern is set in advance both in the test block generator 29 and the test block collector 39. When detecting a test block from BLK 201-1, the test block collector 39 collects the test block and sends out an IDLE block 220 instead and BLK 201-1 (block type identifier) is set to "0 (invalid)". The IDLE block 220 is discarded before writing in the packet regenerating VIQ 33. The test block collector 39 inspects the bit pattern of the collected test block to check if the redundant crossbar switch plane is faulty or not. FIG. 24 shows the failure recovery by changing over the bit corresponding to the crossbar switch 10-3 to "0" and the bit corresponding to the crossbar switch 10-5 to "1" in the REREG 24-3 when a failure occurred in the crossbar switch 10-3 while the crossbar switch 10-5 had been set as a redundant system in advaice.

As is clear from this embodiment, a packet communication apparatus according to the present invention, when used in an operation mode that one of the crossbar switches 10 is set as a redundant system, provides a highly reliable switching with a conductivity test means for a redundant system.

Figure 30:
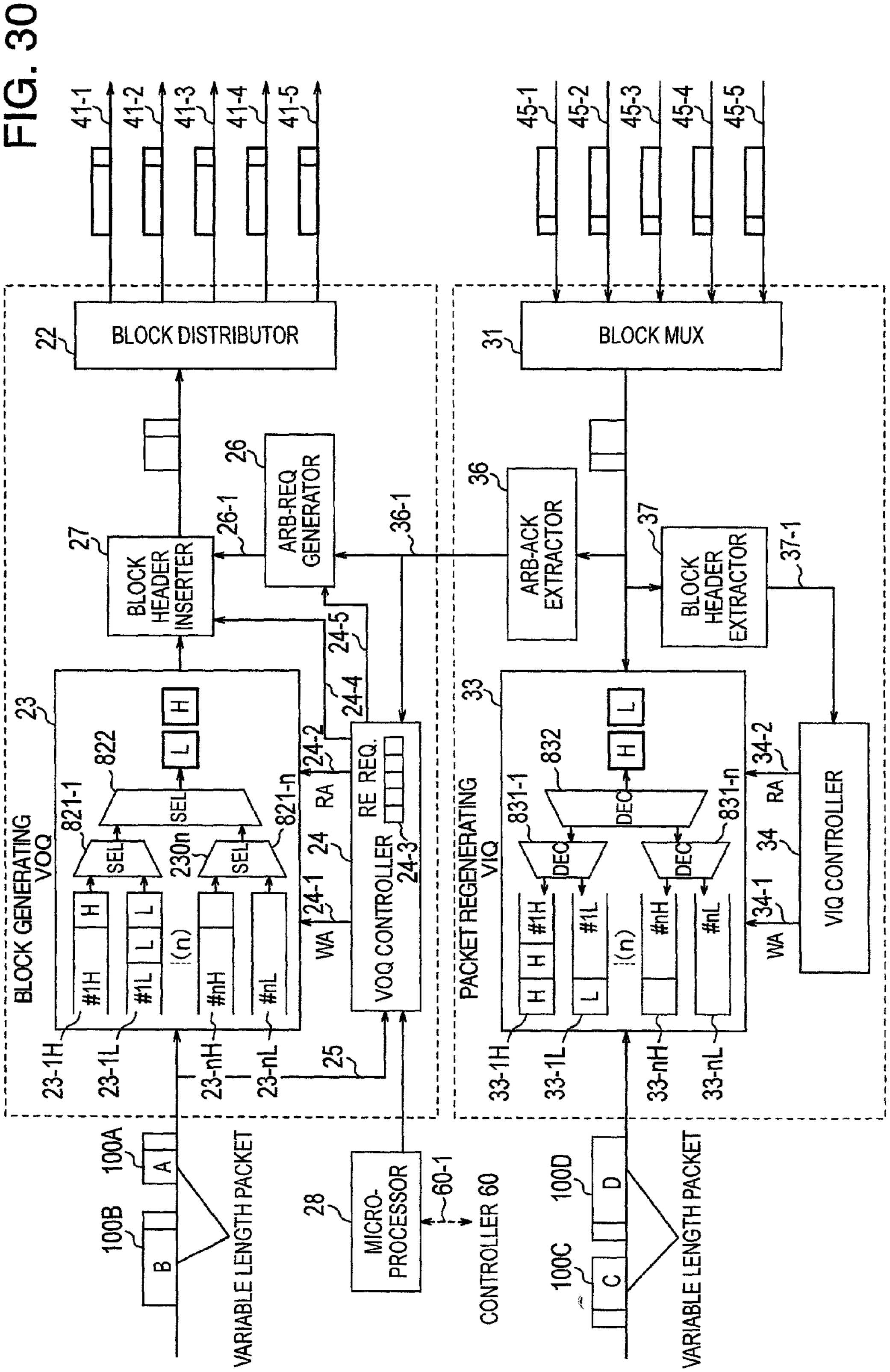
FIG. 30 is a block diagram showing another structure of a line interface card in a packet communication apparatus according to one embodiment of the present invention.

To cite another embodiment, referring to FIG. 30, switch configuration with quality class control will be described. The line interface with quality control in FIG. 30 shows only differences from the line interface 20 depicted in FIG. 3. In each line interface, the block generating VOQ 23 includes two-quality-class VOQs (higher-priority 23-1H~**23-*n*H and lower-priority 23-1L~23-*n*L) are provided. Packets coming from the input packet processor are input into corresponding VOQs according to RTG 101-3 and QOS 101-2 in packet information 101. The corresponding VOQ controller 24, when receiving a read command to a certain destination, selects a VOQs of the destination by a route selector (SEL) 822. If the existence of a block in a high priority VOQ 23-*x*H (x denotes one of numbers 1~n) is detected by a quality class selector (SEL) 821, the VOQ controller 24 reads the block, and if a high priority block is not detected, the VOQ controller 24 reads a block from a low priority VOQ 23-*x*L. The block header inserter 27 distinguishes quality classes by bits of QOS 201-1 in a block header 201. On the downstream side of the line interface capable of quality control, the blocks switched by the crossbar switches are assigned by the VIQ controller 27 into two-quality class VIQs (higher-priority 33-1H to 33-*n*H and lower-priority 33-1L~33-*n*L**).

In this embodiment, a case where blocks are divided into quality classes is shown as an example. A switch system may be configured in such a way that higher-priority portions and lower-priority portions are mixed in a single block. In this case, one block is formed by reading packets in a higher-priority VOQ **23-*x*H (x denotes one of numbers l~n) with preference above packets in a lower-priority VOQ 23-*x*L**.

As has been described, a packet communication apparatus according to this embodiment of the present invention is made applicable to high quality service required for streaming media transmission and transaction processes by providing multiple quality classes control in the block generating VOQ 23 and the packet regenerating VIQ 33.

According to the embodiments described, the following effects can be expected.

(1) In constructing a large-capacity packet communication apparatus, it is possible to provide switch systems with high reliability and a by using a small amount of hardware.

(2) The switch installation can be expanded or reduced without service interruption and it is possible to build a packet communication apparatus with faults tolerance.

(3) The crossbar switch is configured so as to send out blocks to desired output ports according to attached routing tags. Therefore, it is not necessary to configure the crossbar switches by an external scheduler.

(4) In all or one of crossbar switches, scheduling is carried out in such a manner as to select optimum connections of the input and output ports of the crossbar switches based on arbiter request information added to blocks input from all line interfaces, and results (arbiter acknowledge information) are added to the headers of blocks output to the line interfaces. This arrangement lessens restrictions on high-speed processing in the crossbar switches and crossbar switch control.

The representative aspects of the present invention other than those set forth in appended claims are as follow.

(A) A packet switch comprising:

a plurality of line interfaces each connectable to an input line and an output line;

a back panel capable of mounting n crossbar switches each connected to the plurality of line interfaces, each of the plurality of line interfaces including input queue buffers as many as said plurality of line interfaces; a block distributor; and a read controller for reading input packets buffered in the plurality of input buffers, in fixed length block units at cyclic time slots corresponding to the n crossbar switches, and sending read blocks to the block distributor, wherein when n-k crossbar switches are mounted on the back panel, the read controller reads n-k blocks from one input queue buffer selected out of the plurality of input buffers at time slots corresponding to the n-k crossbar switches, and sends the above-mentioned blocks to the block distributor, but does not read blocks at time slots corresponding to k crossbar switches which are not mounted on the back panel, wherein the block distributor outputs each of the n-k blocks to a crossbar switch corresponding to a time slot at which the block was read, wherein when one crossbar switch is additionally mounted to the back panel, the read controller reads n-k+1 blocks from one input queue buffer selected out of the plurality of input queue buffers at time slots corresponding to the n-k crossbar switches and also at time slots corresponding to the additionally mounted crossbar switch, sends the above-mentioned blocks to the block distributor, and the block distributor outputs each of the n-k+1 blocks to a corresponding crossbar switch at a time slot at which the block was read.

(B) A packet switch set forth in (A), wherein the read controller reads the above-mentioned input packets buffered in the plurality of input queue buffers in fixed length block units from the head of each queue at cyclic time slots allocated to the n crossbar switches.

(C) A packet switch comprising:

a plurality of line interfaces connectable to an input line and an output line;

n crossbar switches connected to the plurality of line interfaces and at least one redundant crossbar switch for use when a fault occurs in the n crossbar switches, each of the plurality of line interfaces including input queue buffers as many as the plurality of line interfaces; and a block distributor, wherein the block distributor sends n data blocks read out in fixed length units from a selected one of the plurality of input queue buffers to the n crossbar switches, and sends a test block which contains a specific bit pattern to the at least one redundant crossbar switch.

(D) A packet switch set forth in (C), wherein each line interface of the plurality of line interfaces holds data formed by the same bit pattern as the above-mentioned test block, and compare said data with the test block received from the at least one redundant crossbar switch.

(E) A packet switch set forth in (C), wherein each line interface of the plurality of line interfaces includes output queue buffers as many as the plurality of line interfaces, wherein the n data blocks are buffered in one of the plurality of output queue buffers, and wherein the test pattern is not buffered in the one queue buffer and discarded.

(F) A packet switch set forth in (D), wherein each line interface of the plurality of line interfaces includes output queue buffers as many as the plurality of line interfaces, and wherein the n data blocks are buffered in one of the plurality of output queue buffers, and wherein the test pattern is not buffered in the one queue buffer and discarded.

What is claimed is:

1. A packet switch comprising:

a plurality of line interfaces each connectable to an input line and an output line; and a back panel capable of mounting n number of crossbar switches each connected to said plurality of line interfaces, wherein each of said plurality of line interfaces includes input queue buffers as many as said plurality of line interfaces, a block distributor, and a read controller for reading input packets buffered in said plurality of input buffers, in fixed length block units at cyclic time slots allocated to said n number of crossbar switches, and for sending read blocks to said distributor, wherein n number of crossbar switches are mounted on said back panel, said read controller reads n number of blocks from one input queue buffer selected out of said plurality of input buffers at time slots corresponding to said n number of crossbar switches, and sends said blocks to said block distributor, wherein said block distributor outputs said n number of blocks to said n number of crossbar switches, wherein when k number of crossbar switches out of said n number of crossbar switches are unused or faults occur in said k number of crossbar switches, said read controller reads n minus k number of blocks from one selected input queue buffer out of said plurality of input queue buffers at time slots corresponding to n minus k number of crossbar switches in operation and sends said blocks to said block distributor but does not read blocks at time slots corresponding to said k number of crossbar switches, and wherein said block distributor outputs said n minus k number of blocks to said n minus k number of crossbar switches in operation.

2. A packet switch according to claim 1, wherein each line interface of said plurality of line interfaces includes a header inserter, and when n number of crossbar switches are mounted on said back panel, said block distributor outputs said n number of blocks each added with a header generated by said header inserter, and wherein when k number of crossbar switches out of said n number of crossbar switches are unused or when faults occur in said k number of crossbar switches, said block distributor outputs said n minus k number of blocks each added with a header generated by said header inserter to said n minus k number of crossbar switches in operation, and outputs headers generated by said header inserter to said k number of crossbar switches.

3. A packet switch according to claim 2, wherein each line interface of said plurality of line interfaces includes a header extractor and output queue buffers as many as said plurality of line interfaces, wherein a first identifier is written in headers added to said n number of blocks and said n minus k number of blocks, and a second identifier is added to headers output to said k number of crossbar switches, and wherein said header extractor sends only blocks each added with a header having said first identifier written therein, out of data from the n number of crossbar switches, to output queue buffers.

4. A packet switch comprising:

a plurality of line interfaces each connectable to an input line and an output line; and a back panel capable of mounting n number of crossbar switches each connected to said plurality of line interfaces, wherein each of said plurality of line interfaces includes input queue buffers as many as said plurality of line interfaces, a block distributor, and a read controller for reading input packets buffered in said plurality of input buffers, in fixed length block units at cyclic time slots allocated to said n number of crossbar switches, and for sending read blocks to said block distributor, wherein when n minus k number of crossbar switches are mounted on said back panel, said read controller reads n minus k number of blocks from one input queue buffer selected out of said plurality of input buffers at time slots allocated to said n minus k number of crossbar switches, and sends said blocks to said block distributor, but does not read blocks at time slots allocated to k number of crossbar switches not mounted on said back panel, wherein said block distribution controller outputs said n minus k number of blocks to said n minus k number of crossbar switches, and wherein when one crossbar switch is additionally mounted to said back panel, said read controller reads n-k+1 number of blocks from one input queue buffer selected out of said plurality of input queue buffers at time slots allocated to said n minus k number of crossbar switches and also at time slots corresponding to said additionally mounted crossbar switch, sends said blocks to said block distributor, and said block distributor outputs said n-k+1 number of blocks to said n minus k number of crossbar switches and said additionally mounted crossbar switch.

5. A packet switch comprising:

a plurality of line interfaces each connectable to an input line and an output line; and a back panel capable of mounting n number of crossbar switches each connected to said plurality of line interfaces, wherein each of said plurality of line interfaces includes input queue buffers as many as said plurality of line interfaces, a block distributor, and a read controller for reading input packets buffered in said plurality of input buffers, in fixed length block units at cyclic time slots allocated to said n number of n crossbar switches, and for sending read blocks to said distributor, wherein n number of crossbar switches are in operation on said back panel, said read controller reads n number of blocks from one input queue buffer selected out of said plurality of input buffers at time slots corresponding to said n number of crossbar switches, and sends said blocks to said block distributor, wherein said block distributor outputs each of said n number of blocks to a crossbar switch corresponding to a time slot at which the block was read, wherein when k number of crossbar switches out of said n number of crossbar switches are unused or faults occur in said k number of crossbar switches, said read controller reads n minus k number of blocks from one selected input queue buffer out of said plurality of input queue buffers at time slots corresponding to n minus k number of crossbar switches in operation and sends said blocks to said block distributor but does not read blocks at time slots corresponding to said k number of crossbar switches, and wherein said block distributor outputs said n minus k number of blocks to crossbar switches corresponding to time slots at which said blocks were read.

6. A packet switch according to claim 5, wherein said read controller reads input packets buffered in said plurality of input queue buffers, in fixed length block units starting from head of each queue at cyclic time slots allocated to said n number of crossbar switches.

7. A packet switch according to claim 5, wherein when each line interface of said plurality of line interfaces includes a header inserter and n number of crossbar switches are mounted on said back panel, said block distributor outputs said n number of blocks each added with a header generated by said header inserter, and wherein when k number of crossbar switches out of said n number of crossbar switches are unused or faults occur in said k number of crossbar switches, said block distributor outputs said n minus k number of blocks each added with a header generated by said header inserter, and outputs headers generated by said header inserter to said k number of crossbar switches.

8. A packet switch according to claim 6, wherein each line interface of said plurality of line interfaces includes a header inserter and n number of crossbar switches are mounted on said back panel, said block distributor outputs said n number of blocks each added with a header generated by said header inserter, and wherein when k number of crossbar switches out of said n number of crossbar switches are unused or faults occur in said k number of crossbar switches, said block distributor outputs said n minus k number of number of blocks each added with a header generated by said header generator, and outputs headers generated by said header generator to said k number of crossbar switches.

9. A packet switch according to claim 7, wherein each line interface of said plurality of line interfaces includes a header extractor and output queue buffers as many as said plurality of line interfaces, wherein a first identifier is written in headers added to said n number of blocks and said n minus k number of blocks and a second identifier is written in headers outputs from said k number of crossbar switches, and wherein said header extractor outputs only blocks added with headers having said first identifier written therein, out of data from said n number of crossbar switches, to output queue buffers.

10. A packet switch according to claim 8, wherein each line interface of said plurality of line interfaces includes a header extractor and output queue buffers as many as said plurality of line interfaces, wherein a first identifier is written in headers added to said n blocks and said n minus k number of blocks and a second identifier is written in headers output from said k number of crossbar switches, and wherein said header extractor outputs only blocks added with headers having said first identifier written therein, out of data sent from said n number of crossbar switches, to said output queue buffers.

* * * * *